(12) United States Patent
Kanthak et al.

(10) Patent No.: US 11,474,991 B2
(45) Date of Patent: Oct. 18, 2022

(54) INCLUDING TRANSACTIONAL COMMIT TIMESTAMPS IN THE PRIMARY KEYS OF RELATIONAL DATABASES

(71) Applicant: Google LLC, Mountain View, CA (US)

(72) Inventors: Sebastian Kanthak, Los Altos, CA (US); Brian Frank Cooper, Los Altos, CA (US)

(73) Assignee: Google LLC, Mountain View, CA (US)

( * ) Notice: Subject to any disclaimer, the term of this patent is extended or adjusted under 35 U.S.C. 154(b) by 116 days.

(21) Appl. No.: 16/978,361

(22) PCT Filed: Mar. 13, 2018

(86) PCT No.: PCT/US2018/022156
§ 371 (c)(1),
(2) Date: Sep. 4, 2020

(87) PCT Pub. No.: WO2019/177591
PCT Pub. Date: Sep. 19, 2019

(65) Prior Publication Data
US 2021/0042284 A1 Feb. 11, 2021

(51) Int. Cl.
*G06F 17/30* (2006.01)
*G06F 16/23* (2019.01)
(Continued)

(52) U.S. Cl.
CPC ........ *G06F 16/2322* (2019.01); *G06F 16/221* (2019.01); *G06F 16/2358* (2019.01); *G06F 16/2365* (2019.01); *G06F 16/284* (2019.01)

(58) Field of Classification Search
CPC ........ G06F 16/13; G06F 16/24; G06F 16/156; G06F 16/2365; G06N 3/00; G06N 5/00; G05B 13/00
See application file for complete search history.

(56) References Cited

U.S. PATENT DOCUMENTS

| 5,212,788 A * | 5/1993 | Lomet ............... G06F 16/2477 |
| 9,424,070 B2 * | 8/2016 | Hutton ................ G06F 9/466 |

(Continued)

FOREIGN PATENT DOCUMENTS

WO     2013170269 A1    11/2013

OTHER PUBLICATIONS

International Preliminary Report on Patentability for International Application No. PCT/US2018/022156 dated Sep. 24, 2020. 9 pages.
(Continued)

*Primary Examiner* — Hung D Le
(74) *Attorney, Agent, or Firm* — Lerner, David, Littenberg, Krumholz & Mentlik, LLP

(57) ABSTRACT

In a distributed database, a transaction is to be committed at a first coordinator server and one or more participant servers 1210. The first coordinator server is configured to receive a notification that each participant server of the transaction is prepared at a respective prepared timestamp, the respective prepared timestamp being chosen within a time range for which the respective participant server obtained at least one lock 1220. The first coordinator server computes the commit timestamp for the transaction equal or greater than each of the prepared timestamps 1230, and restrict the commit timestamp such that a second coordinator server sharing at least one of the participant servers for one or more other transactions at a shared shard cannot select the same commit timestamp for any of the other transactions 1240. The transaction is committed at the commit timestamp 1250.

23 Claims, 12 Drawing Sheets

(51) Int. Cl.
*G06F 16/22* (2019.01)
*G06F 16/28* (2019.01)

(56) References Cited

U.S. PATENT DOCUMENTS

| | | | |
|---|---|---|---|
| 9,569,253 B1 | 2/2017 | Hsieh et al. | |
| 2003/0079094 A1* | 4/2003 | Rajwar | G06F 9/52 712/E9.05 |
| 2004/0030703 A1* | 2/2004 | Bourbonnais | G06F 16/2379 |
| 2007/0050429 A1 | 3/2007 | Goldring et al. | |
| 2011/0302143 A1 | 12/2011 | Lomet | |
| 2016/0147813 A1 | 5/2016 | Lee et al. | |
| 2016/0246527 A1* | 8/2016 | Kogan | G06F 9/52 |
| 2016/0299798 A1* | 10/2016 | Bhattacharjee | G06F 9/467 |
| 2017/0177698 A1 | 6/2017 | Lee et al. | |
| 2018/0074865 A1* | 3/2018 | Rungta | G06F 1/24 |
| 2018/0322157 A1* | 11/2018 | Lee | G06F 16/27 |
| 2019/0057124 A1* | 2/2019 | D'Halluin | G06F 16/2315 |

OTHER PUBLICATIONS

Mahmoud, A. Hatem, et al., "MaaT: Effective and Scalable Coordination of Distributed Transactions in the Cloud", Proceedings of the VLDB Endowment, vol. 7, No. 5 (2014), 12 pgs.

Harding, Rachael, et al., "An Evaluation of Distributed Concurrency Control", Proceedings of the VLDB Endowment, vol. 10, No. 5 (2017) pgs.

Shute, Jeff, et al., "F1: A Distributed SQL Database That Scales", Proceedings of the VLDB Endowment, vol. 6, No. 11 (2013) 12 pgs.

Xu, Min, et al., "A Serializability Violation Detector for Shared-Memory Server Programs", PLDI'05 ACM (2015) 14 pgs.

Yu, Xiangyao, "Staring into the Abyss: An Evaluation of Concurrency Control with One Thousand Cores", Proceedings of the VLDB Endowment, vol. 8, No. 3 (2014) 12 pgs.

Faleiro, M. Jose and Abadi, J. Daniel, "Rethinking Serializable Multiversion Concurrency Control", Proceedings of the VLDB Endowment, vol. 8, No. 11 (2015) 12 pgs.

Corbett, C. James, et al., "Spanner: Google's Globally-Distributed Database", Published in the Proceedings of OSDI 2012 (2012) 14 pgs.

Bacon, F. David, "Spanner: Becoming a SQL System", SIGMOD'17 ACM (2017) 13 pgs.

Lin, Qian, et al.,"Towards a Non-2PC Transaction Management in Distributed Database Systems", SIGMOD '16, ACM (2016) 16 pgs.

International Search Report and Written Opinion for Application No. PCT/US2018/022156 dated May 7, 2018. 15 pages.

First Examination Report for Indian Patent Application No. 202047038475 dated Nov. 26, 2021. 7 pages.

\* cited by examiner

INCLUDING TRANSACTIONAL COMMIT TIMESTAMPS IN THE PRIMARY KEYS OF RELATIONAL DATABASES

CROSS-REFERENCE TO RELATED APPLICATIONS

The present application is a national phase entry under 35 U.S.C. § 371 of International Application No. PCT/US2018/022156, filed Mar. 13, 2018, the entire disclosure of which is hereby incorporated herein by reference.

BACKGROUND

In database systems, concurrency control refers to a technique used to address conflicts arising as a result of allowing simultaneous access to data items in the database ("concurrency"). Concurrency control ensures that the database behaves consistently despite allowing simultaneous access. Multiversion concurrency-control techniques store multiple versions of a given piece of data (one per write), so as to enable greater concurrency. Systems that provide a global notion of absolute time can be integrated with multiversion concurrency control in a distributed database. The resulting distributed database is semantically equivalent to a single-machine database, in that consistent reads can be done across the entire database.

BRIEF SUMMARY

The present disclosure provides for a method comprising receiving, at a first coordinator server and one or more participant servers in a distributed system, a request to commit a transaction, receiving a notification from each of the participant servers, the notification including a respective prepared timestamp, the respective prepared timestamp being chosen within a time range for which the respective participant server obtained at least one lock, computing a commit timestamp for the transaction equal or greater than each of the prepared timestamps, restricting the commit timestamp such that a second coordinator server sharing at least one of the participant servers for one or more other transactions at a shared shard cannot select the same commit timestamp for any of the other transactions, and committing, at the first coordinator server and each of the participant servers, the transaction at the commit timestamp. The at least one lock may be a writer shared lock. The request to commit a transaction may further include a mutation to update a change log recording the transaction. The commit timestamp may be included as a primary key of the change log. At least part of the change log may be stored at one of the participant servers. The request to commit a transaction may further include a mutation to update a plurality of change logs recording the transaction. The method may further comprise adding at least one column in a relation database to store the commit timestamp as a primary key in the relational database.

The method may further comprise computing a hash value of a transaction ID of the transaction, and further restricting the commit timestamp for the transaction by the hash value of the transaction ID. For example, the further restricting the commit timestamp may comprise setting a predetermined number of lower bits of the commit timestamp to be equal to the hash value of the transaction ID.

The method may further comprise determining that the first coordinator server received one or more requests to commit other transactions and computing a commit timestamp for each of the other transactions received at the first coordinator sever such that a total spacing between the commit timestamps is substantially minimized.

The method may further comprise determining, at the shared participant server, that the hash value of the transaction ID is equal to a hash value of a transaction ID of at least one of the other transactions, and preventing, at the shared participant server, at least one of the other transactions having the same hash value from taking a lock until the transaction commits.

The method may further comprise determining, at one or more of the participant servers, that a single-site transaction is to be committed at the participant server, computing a single-site commit timestamp having a predetermined pattern for the single-site transaction, the predetermined pattern being one that any multi-site transaction cannot choose as its commit timestamp, and committing the single-site transaction at the single-site commit timestamp.

The method may further comprise determining, at one or more of the participant servers, that a single-site transaction is to be committed at the participant server, computing a hash value of a transaction ID of the single-site transaction, and restricting the commit timestamp for the single-site transaction by the hash value of the transaction ID of the single-site transaction. For example, restricting a commit timestamp for the single-site transaction may comprise setting a predetermined number of lower bits of the commit timestamp of the single-site transaction to be equal to the hash value of the transaction ID of the single-site transaction.

The present disclosure further provides for a method comprising receiving, at a coordinator server and one or more participant servers in a distributed system, a request to commit a transaction, obtaining, by each of the participant servers, at least one exclusive lock for a time range starting at a locally chosen starting time to a predetermined upper bound, receiving, at the coordinator server, a notification that each of the participant servers is prepared at a respective locally chosen prepared timestamp within the time range, computing, at the coordinator server, a commit timestamp for the transaction equal or greater than each of the prepared timestamps, committing, at the coordinator server and each of the participant servers, the transaction at the commit timestamp, and releasing, at each of the participant servers, the at least one exclusive lock. The predetermined upper bound may be infinity. The request to commit a transaction may further include a mutation to update a change log recording the transaction. The method may further comprise adding at least one column in a relation database to store the commit timestamp as a primary key in the relational database.

The present disclosure further provides for a system comprising a first coordinator server in a plurality of servers, each of the servers adapted to communicate with each other and clients in a distributed computing environment, the first coordinator server comprising one or more processors configured to receive a request to commit a transaction, receive a notification that any of the other servers functioning as participants of the transaction is prepared at a respective prepared timestamp, the respective prepared timestamp being chosen within a time range for which the respective participant server obtained at least one lock, compute a commit timestamp for the transaction equal or greater than each of the prepared timestamps such that a second coordinator server sharing at least one of the participant servers for one or more other transactions at a shared shard cannot select the same commit timestamp for any of the other transactions, and commit the transaction at the commit timestamp. The one or more processors may be further configured to compute a hash value of a transaction ID of the transaction and further restrict the commit timestamp for the transaction by the hash value of the transaction ID. The one or more processors may be further configured to determine that one or more requests to commit other transactions is received at the first coordinator server and compute a commit timestamp for each of the other transactions such that a total spacing between the commit timestamps is substantially minimized. The distributed computing environment may comprise a relational database, where the one or more processors may be further configured to add at least one column in the relation database to store the commit timestamp as a primary key in the relational database.

The system may further comprise a participant server, the participant server comprising one or more processors configured to determine that a single-site transaction is to be committed at the participant server, compute a single-site commit timestamp having a predetermined pattern for the single-site transaction, the predetermined pattern being one that any multi-site transaction cannot choose as its commit timestamp, and commit the single-site transaction at the single-site commit timestamp.

DETAILED DESCRIPTION

Overview

Figure 1:
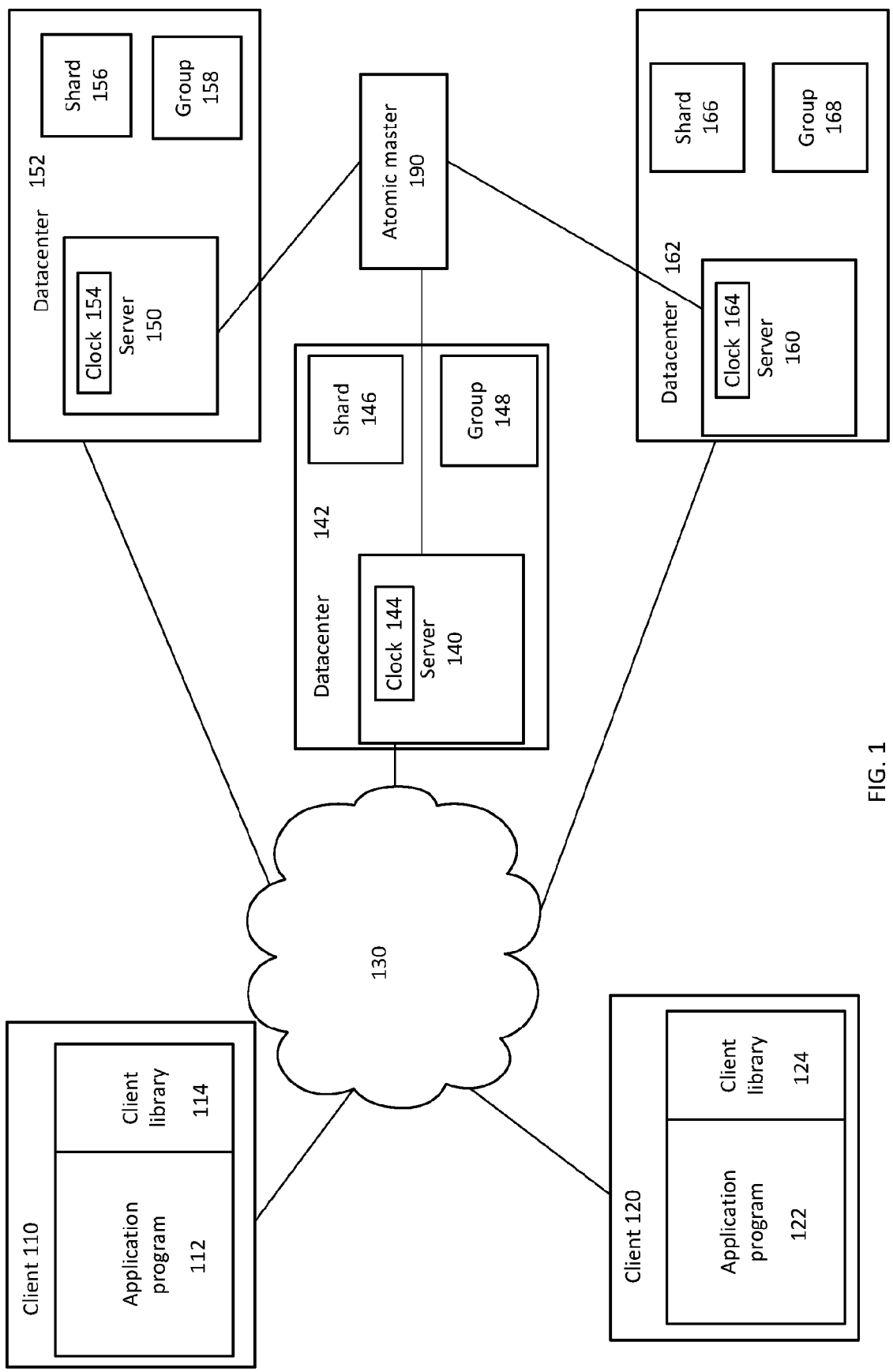
FIG. 1 is a block diagram illustrating an example system according to aspects of the disclosure.

The technology generally relates to methods of determining commit timestamps and providing the commit timestamps to users of a distributed database. For example, users may use commit timestamps to see snapshots of the database at various points in time, or to build a transaction log for changes made to a database. In order to provide users with meaningful commit timestamps, each transaction for the same data item must correspond to a unique commit timestamp. This way, the user may use these commit timestamps to read the different versions of the data at different specific timestamps, or to see all the changes made to the data item.

Further, there are provided efficient methods of determining meaningful commit timestamps to make sure that throughput of the database is not compromised.

In a distributed database, a transaction is to be committed at a first coordinator server and one or more participant servers. The first coordinator server is configured to receive a notification that each participant server of the transaction is prepared at a respective prepared timestamp, the respective prepared timestamp being chosen within a time range for which the respective participant server obtained at least one lock. The first coordinator server computes the commit timestamp for the transaction equal or greater than each of the prepared timestamps, and restrict the commit timestamp such that a second coordinator server sharing at least one of the participant servers for one or more other transactions at a shared shard cannot select the same commit timestamp for any of the other transactions.

In a distributed database, data is read and/or written in multiple shards, distributed over a plurality of computing devices, such as servers, in a distributed network of datacenters. In some instances, the same shard may be replicated on multiple servers to prevent loss of data in case if one of the servers fails. Each server may store and execute actions for multiple shard and/or shard replicas. The totality of replicas of a single shard forms a group hi a multi-site transaction reading and/or writing to multiple shards, one of the servers storing one of the shards (or a plurality of servers storing one of the groups) may be chosen as a "coordinator server" (or a "coordinator server group") while all the other servers storing the other shards (or a plurality of servers storing the other groups) may be chosen as "participant servers" (or "participant server groups"). While a server (or server group) may be chosen as the coordinator server (or coordinator server group) for one or more transactions, the server (or server group) may also simultaneously be chosen as the participant server (or participant server group) for one or more other transactions. For sake of simplicity, from here on, "shard" is used interchangeably with "group," "coordinator server" is used interchangeably with "coordinator server group," and "participant server" is used interchangeably with "participant server group."

When a commit message for a transaction is received at the coordinator server and the participant servers for a multi-site transaction, the coordinator server and the participant servers may each acquire a lock for a range from the time the lock is acquired until an upper bound. Each of the participant servers may locally choose a prepared timestamp, write a prepared record, and notify the coordinator server that it is prepared from the prepared timestamp and onwards. Once the coordinator server receives a prepared notification that all of the participant servers are prepared, the coordinator server may choose a commit timestamp equal or greater than any of the prepared timestamps and any commit timestamp it has previously assigned to other transactions. The coordinator server and each of the participant servers then execute the transaction at the commit timestamp. In addition to being a participant server for a multi-site transaction, a server storing a shard may also receive a request to commit a single-site transaction locally at the shard.

One example method that ensures unique commit timestamps are chosen for various multi-site and/or single-site transaction at a shared shard is to only allow participant servers of a distributed transaction to take exclusive locks at the shared shard for a range of time until a commit timestamp is chosen. For example, each participant server may take an exclusive lock from a locally chosen starting time to infinity, or from a locally chosen starting time to an estimated upper bound.

In another example method, the participant servers may take shared locks at the shared shard, but the commit timestamps that may be chosen in certain situations are restricted. For example, a coordinator server may restrict the commit timestamp for a multi-site transaction such that no other coordinator server sharing the same participant server at a shared shard could choose the same commit timestamp for another multi-site transaction. For instance, the coordinator server may do so by computing a hash value of a transaction ID of the transaction, and then computing the commit timestamp by finding the next available time equal or greater than any of the prepared timestamps that has its lower N-bits (e.g., lower 10 bits) equal to the hash value. In other examples, commit timestamps for single-site transactions may also be restricted. For example, single-site transactions may be assigned timestamps excluded from ones that could be chosen for multi-site transactions. In another example, a coordinator server that received requests to commit multiple transactions may choose a commit timestamp for each of the transactions such that a total spacing between all the commit timestamps is substantially minimized.

To prevent two coordinator servers from choosing the same commit timestamp (a "timestamp collision"), for example, in the event if two transaction IDs hash to the same value (a "hash collision"), an exclusive lock may be taken by the participant server for one of the transactions. In another example, the participant server may be allowed to only take a writer-shared restrictive lock for the first transaction, and the second transaction is placed in a waiting queue until the participant server releases the writer-shared restrictive lock on the first transaction.

In another example method, coordinator servers with shared participant servers and shared shards may communicate with each other to ensure that unique commit timestamps are chosen. In yet another example method, a global manager may choose all commit timestamps to ensure that commit timestamps are unique.

The commit timestamps may be provided to users in one or more columns of a table. For example, commit timestamps may be provided in a primary key column, meaning that the commit timestamps must be unique. One particular example involves a change log that a user may maintain to keep track of all change made in a database, where the commit timestamps may be provided in one or more columns of the change log. For example, the user may request a transaction to modify some data item, and also include in that transaction request a mutation to record the transaction in the change log. For another example, the user may request a transaction that spans multiple databases, and include in that transaction request a mutation to update a separate change log for each database. For still another example, it is often desirable to query a relational database by table row creation time. For example, there are provided methods and systems with a mechanism for including table row creating timestamps in the primary keys of the relational database. The relational database can be part of a distributed database. It is advantageous to include the commit timestamps as row creating timestamps in the primary keys of the relational database since specifying primary key constraints is a very efficient way of querying relational databases. According to methods and systems described herein, there are provided schemas for commit timestamps in databases to make the commit timestamps readable in database queries and reads by allowing the schemas to add columns to the database to store the commit timestamps in the database. Using the commit timestamp as primary key in a relational distributed database has several advantages. One advantage is that the commit timestamp provides a simple guarantee. If a transaction A has a lower commit timestamp than another transaction B, then transaction A committed before B. Therefore, the user can treat the distributed database like a single-machine database and assume that all mutations that happened in transaction A were visible to transaction B. In other words, methods and systems described herein provides the appearance of executing transactions atomically in a serial order consistent with the commit timestamp and allow application developers to establish a global partial ordering to all transactions in a distributed database system. Another advantage is if the commit timestamp is based on a globally synchronized clock, which ensures that commit timestamps are accurate and consistent globally, so that the user is immune from clock-skew on different servers running shards of the database.

The technology is advantageous because it provides meaningful commit timestamps to users without significantly compromising the throughput of a distributed database. Although the user's database may be highly distributed, the user may use the commit timestamps to view changes made to various data items as if the database was kept on a single machine. The technology further provides various methods to increase efficiency, for example, by avoiding exclusive locks, minimizing spacing between commit timestamps, and providing different treatments for multi-site and single-site transactions.

Example Systems

FIG. 1 illustrates an example system including a distributed database. A plurality of computing devices, such as servers 140, 150, 160, may communicate with each other, for example, over a network 130. The servers 140, 150, 160 may further communicate with a plurality of client computing devices, such as clients 110, 120. The servers 140-160 may control storage of data in one or more databases. For example, as shown each server 140-160 is associated with a datacenter 142, 152, 162. Each datacenter 142, 152, 162 may include a plurality of computing devices for storing data. In the distributed database, data items of a database may be sharded onto multiple distinct shards, such as shards 146, 156, 166, each shard may be replicated onto multiple computing devices, such as servers, at one datacenter, for example datacenter 142, or across multiple datacenters, such as datacenters 142, 152, and 162.

Each server may store and execute actions for multiple shard and/or shard replicas. The totality of replicas of a single shard forms a group, for example, group 148 contains all replicas of one shard, group 158 contains all replicas of another shard, and group 168 contains all replicas of yet another shard. The shard replicas may be synchronized by using consensus protocols, such as a Paxos protocol. While some shards may be replicas of other shards, some shards may be causally dependent on others. For example, bits of data written in datacenter 142, for example in shard 146 or group 148, may affect data stored in datacenter 152, for example in shard 156 or group 158. The distributed database may implement a protocol, such as Paxos, to provide consensus across the system. In some current systems, consistency across the datacenters 142, 152, 162 is maintained by the servers 140, 150, 160, which wait for a period of time (e.g., the commit wait) to pass before publishing a write transaction. In other systems, the waiting period may instead be imposed on one or more other devices, moved in time to different actions of the server, or moved to client devices seeking to read the written data.

While only a few datacenters with a few servers, clients, shards, and groups are shown, any number of datacenters may be included in the distributed database, each of which may contain multiple servers (which may communicate with multiple clients), shards, and groups. Similarly, while each server 140, 150, 160 is shown as being associated with its own datacenter, it should be understood that in other examples the servers may be associated with one or more smaller databases. For example, one database may include multiple servers.

Each of clients 110, 120 is shown as having an application program 112, 122 and a client library 114, 124, though it should be understood that additional features of client devices may also be present. Either of the clients 110, 120 may write data to the distributed database by sending data over the network 130 to one of the servers 140, 150, 160. While only a few clients are shown, it should be understood that a vast number of client devices may communicate with the distributed database over the network 130.

The datacenters 142, 152, 162 may be positioned a considerable distance from one another. For example, as further described in connection with FIG. 2, the datacenters may be positioned in various countries around the world. Each datacenter 142, 152, 162 may include a number of storage devices, such as hard drives, random access memory, disks, disk arrays, tape drives, or any other types of storage devices. The datacenters 142, 152, 162 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 142, 152, 162 may be virtualized environments.

Each server has a local clock 144, 154, 164. Each local clock 144, 154, 164 may derive its time from an atomic time master 190. Atomic time master 190 may be, for example, a reference clock in communication with one or more servers in the distributed database. As further described below in connection with FIG. 3, the atomic time master 190 may derive its time from another source, such as a GPS.

Figure 2:
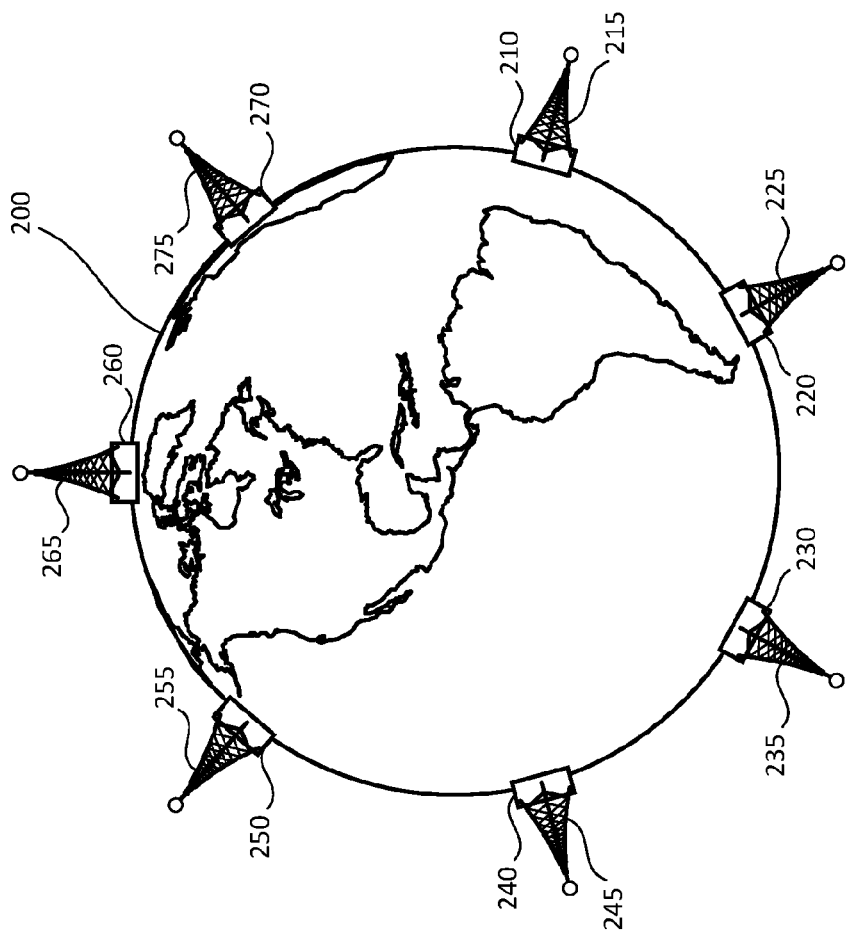
FIG. 2 is a pictorial diagram illustrating distribution of a database according to aspects of the disclosure.

FIG. 2 is a geographical illustration 200 of datacenters 210, 220, 230, 240, 250, 260 and 270 positioned at various locations on earth. According to some examples, each datacenter may include an atomic time master. Each atomic time master may be connected to a receiver such as a GPS receiver for receiving time signals. The GPS receivers may include, for example, roof-mounted antennas 215, 225, 235, 245, 255, 265 and 275, which may be located on the roof above datacenters 210, 220, 230, 240, 250, 260 and 270. Host servers may be housed in server racks located in the datacenters 210, 220, 230, 240, 250, 260 and 270. As such, conduits may be installed to route antenna cables from a host server to the roof top antennas. It may be possible to share one antenna across several receivers. This can be achieved, for example, with an antenna splitter.

Figure 3:
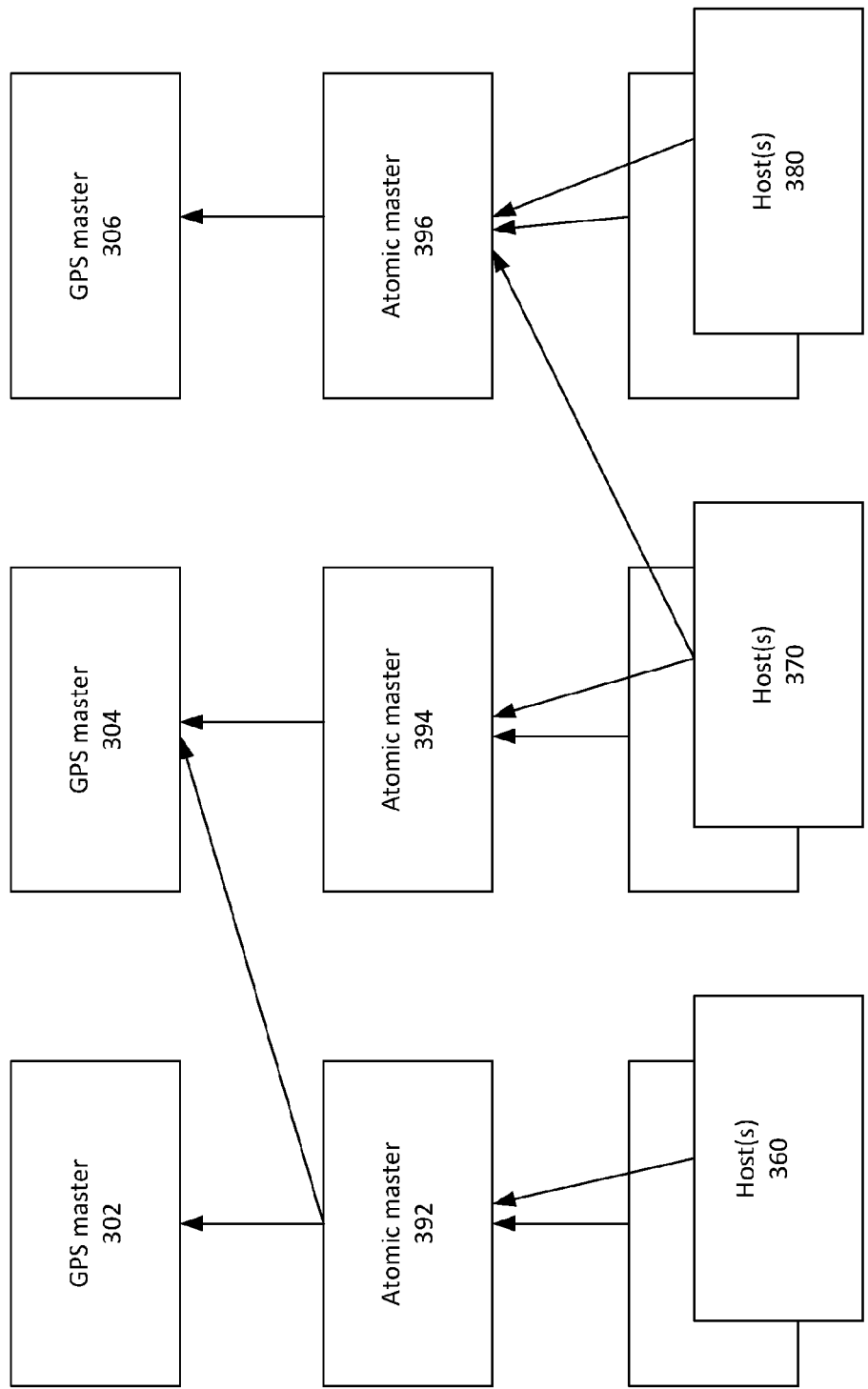
FIG. 3 is a block diagram illustrating hierarchical relationships among servers in a distributed database according to aspects of the disclosure.

FIG. 3 illustrates an example of a time platform 300 that provides a tightly synchronized global clock across datacenters. In this example, the time platform 300 is structured as a three-level hierarchy of servers, each server including its own clock, where child servers calibrate their clocks based on their parents' clocks. Application programs run on hosts 360, 370, 380.

Arrows point from servers that calibrate their clocks to well-known servers with better clocks from which they calibrate. For example, as shown, hosts 360 calibrate their clocks based on atomic master 392. Atomic master 392 calibrates its clock based on GPS time masters 302, 304. Hosts 370 calibrate their clocks based on atomic master 394 and 396. Atomic master 394 calibrates its clock based on GPS time master 304. Hosts 380 calibrate their clocks based on atomic master 396, which calibrates its clock based on GPS time master 306. In some examples, child servers may determine which parent servers to use for calibration based on, for example, geographical position, signal strength, or any other indicia. In other examples, the child/parent pairings may be predetermined. While FIG. 3 shows the hosts 360, 370, 380 calibrating to the atomic masters 392, 394, 396, it should be understood that in other examples the hosts 360, 370, 380 may additionally or alternatively calibrate directly to the GPS time masters 302, 304, 306.

At each level in the hierarchy, calibration consists of polling a server's parent(s), and intersecting one or more time intervals received from the parent(s), expanded by network latency of the calibration from the hosts involved. Each server may have an associated value ($\epsilon$) representing a greatest difference in time between a time reflected on the server's local clock and times reflected by other servers' clocks in the database. Each server's value of $\epsilon$ is derived from its parent's $\epsilon$, with adjustments to uncertainty that come from a product of oscillator frequency uncertainty and effective calibration interval, and server-to-parent network round trip time (RTT). Accordingly, in some examples, a local clock at each server may maintain a different value of E. In other examples, $\epsilon$ may be globally consistent across devices in the system. Further, E may vary over time in some examples, as parameters such as the oscillator frequency uncertainty, effective calibration interval, and RTT change over time.

Oscillator frequency uncertainty can be modeled as consisting of frequency instability, such as how much an oscillator drifts over short time scales, and oscillator aging, such as how much an oscillator's drift changes over long time scales. The effective calibration interval may be determined by a greater of two values: a calibration interval, such as a period of time between calibrations of the server, and how long the server may have to be disconnected from the parent.

With regard to the server-to-parent network RTT, the farther away a host is from its parents, the more phase uncertainty is introduced. This uncertainty can also be modeled as two components: calibration phase uncertainty and calibration frequency uncertainty. Calibration phase uncertainty may correspond to a level of uncertainty in computing phase alignment of the oscillators. Calibration frequency uncertainty may correspond to a level of frequency uncertainty due to uncertainty in the duration of the calibration period.

Figure 4:
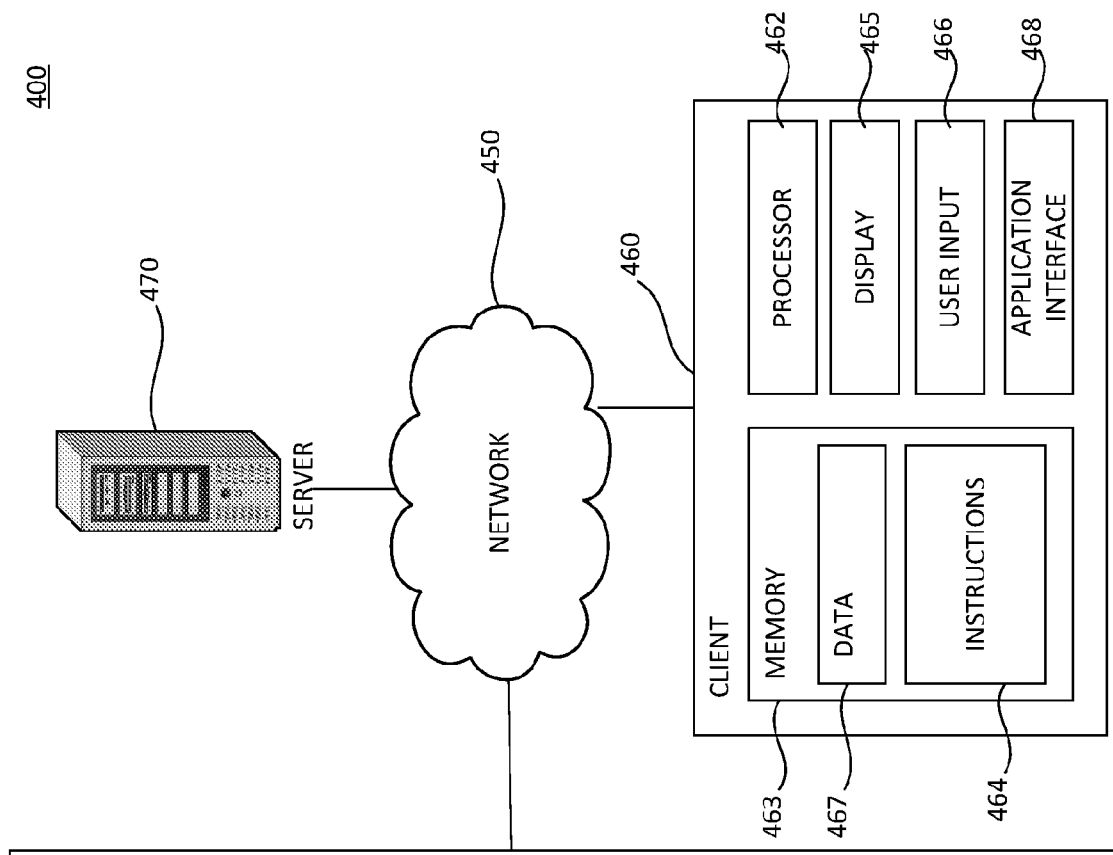
FIG. 4 is a block diagram illustrating an example system according to aspects of the disclosure.
Figure 4:
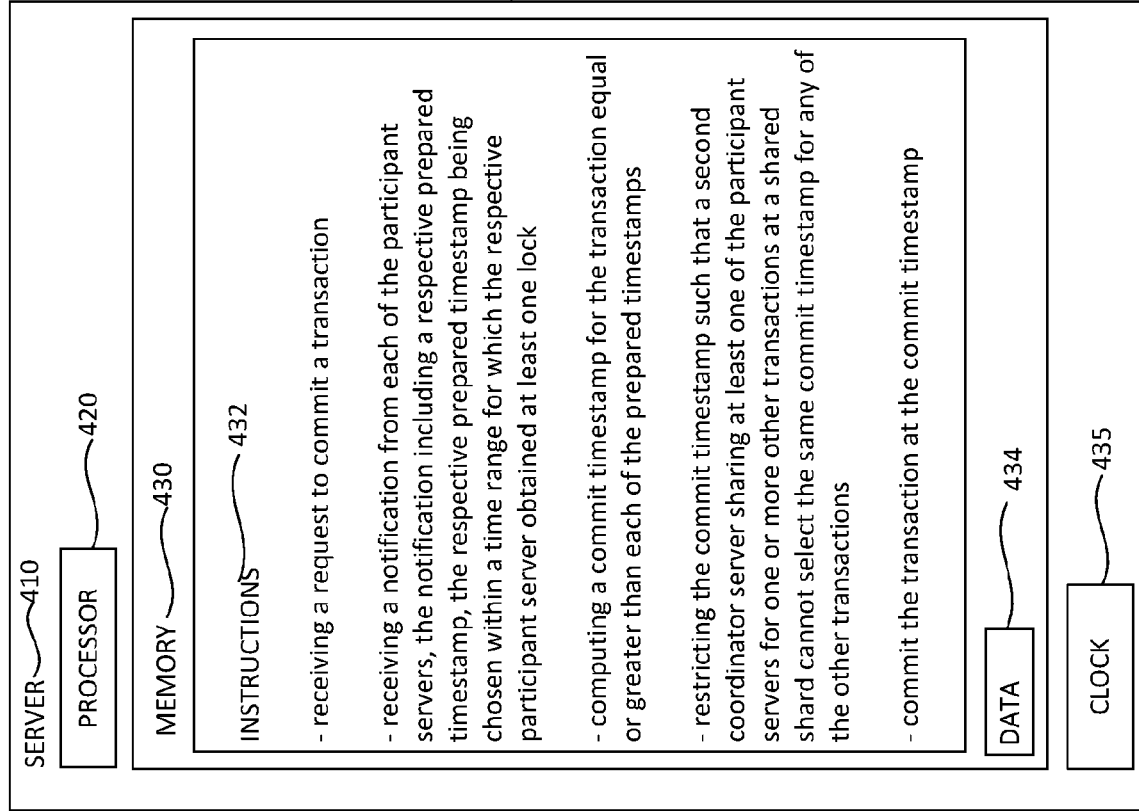

FIG. 4 is a diagram of an example system 400 for providing commit timestamps of a distributed database to users. As shown, an example of system 400 may include a number of servers 410 and 470 coupled to a network 450. The servers 410 and 470 may be located at different datacenters, for example, such as datacenters 142 and 152. The system may also include a client 460 capable of communication with the servers 410 and 470 over the network 450.

The server 410 may contain a processor 420, memory 430, clock 435, and other components typically present in general purpose computers. The memory 430 can store information accessible by the processor 420, including instructions 432 that can be executed by the processor 420.

Memory can also include data 434 that can be retrieved, manipulated or stored by the processor 420. The memory 430 may be a type of non-transitory computer readable medium capable of storing information accessible by the processor 420, such as a hard-drive, solid state drive, tape drive, optical storage, memory card, ROM, RAM, DVD, CD-ROM, write-capable, and read-only memories. The processor 420 can be a well-known processor or other lesser-known types of processors. Alternatively, the processor 420 can be a dedicated controller such as an ASIC.

The instructions 432 can be a set of instructions executed directly, such as machine code, or indirectly, such as scripts, by the processor 420. In this regard, the terms "instructions," "steps" and "programs" can be used interchangeably herein. The instructions 432 can be stored in object code format for direct processing by the processor 420, or other types of computer language including scripts or collections of independent source code modules that are interpreted on demand or compiled in advance. Functions, methods, and routines of the instructions are explained in more detail in the foregoing examples and the example methods below.

The data 434 can be retrieved, stored or modified by the processor 420 in accordance with the instructions 432. For instance, although the system and method is not limited by a particular data structure, the data 434 can be stored in computer registers, in a relational database as a table having a plurality of different fields and records, or XML documents. The data 434 can also be formatted in a computer-readable format such as, but not limited to, binary values, ASCII or Unicode. Moreover, the data 434 can include information sufficient to identify relevant information, such as numbers, descriptive text, proprietary codes, pointers, references to data stored in other memories, including other network locations, or information that is used by a function to calculate relevant data. For example, the data 434 can include time data that may be encoded based on the instructions 432 in a time format used to describe instants of time such as Coordinated Universal Time, Unix epoch and unambiguous International Atomic Time epoch.

Although FIG. 4 functionally illustrates the processor 420 and memory 430 as being within the same block, the processor 420 and memory 430 may actually include multiple processors and memories that may or may not be stored within the same physical housing. For example, some of the instructions 432 and data 434 can be stored on a removable CD-ROM and others within a read-only computer chip. Some or all of the instructions and data can be stored in a location physically remote from, yet still accessible by, the processor 420. Similarly, the processor 420 can actually include a collection of processors, which may or may not operate in parallel.

Servers 410 and 470 may be at one node of network 450 and capable of directly and indirectly communicating with other nodes of the network 450. For example, the servers 410 and 470 can include a web server that may be capable of communicating with client device 460 via network 450 such that it uses the network 450 to transmit information to a client application. Servers 410 and 470 may also include a number of computers, e.g., a load balanced server farm, that exchange information with different nodes of the network 450 for the purpose of receiving, processing and transmitting data to client devices. In this instance, the client computers will typically be at different nodes of the network 450 than the computers making up servers 410 and 470. Although only a few servers 410, 470 are depicted in FIG. 4, it should be appreciated that a typical system can include a large number of connected servers with each being at a different node of the network 450.

Each client 460 may be configured, similarly to servers 410 and 470, with a processor 462, memory 463, instructions 464, and data 467. Each client 460 may be a personal computer, intended for use by a person having all the internal components normally found in a personal computer such as a central processing unit (CPU), CD-ROM, hard drive, and a display device 465, for example, a monitor having a screen, a projector, a touch-screen, a small LCD screen, a television, or another device such as an electrical device that can be operable to display information processed by the processor 462, speakers, a modem and/or network interface device, user input component 466, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 460 may include an application interface module 468. The application interface module may be used to access a service made available by a server, such as servers 410 and 470. For example, the application interface module may include sub-routines, data structures, object classes and other type of software components used to allow servers and clients to communicate with each other. In one aspect, the application interface module 468 may be a software module operable in conjunction with several types of operating systems known in the arts. For example, the client 460 may be connected to a Structured Query Language (SQL) database server that may operate in conjunction with the application interface module 468 for saving and retrieving information data. Memory 463 coupled to a client 460 may store data 467 accessed by the application interface module 468. The data 467 can also be stored on a removable medium such as a disk, tape, SD Card or CD-ROM, which can be connected to client 460.

Servers 410 and 470 and client 460 can be capable of direct and indirect communication such as over network 450. For example, using an Internet socket, a client 460 can connect to a service operating on remote servers 410 and 470 through an Internet protocol suite. Servers 410 and 470 can set up listening sockets that may accept an initiating connection for sending and receiving information. The network 450, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.81, 802.81b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although FIG. 4 shows computing devices 410 and 460 as individual blocks, each of which contains its own processor and memory, the operations described herein may involve a single computing device or many computing devices, e.g., in the "cloud." For example, various operations described herein as involving a single computing device (e.g., a single central processing unit (CPU) in a single server) may involve a plurality of computing devices (e.g., multiple processors in a load-balanced server farm). Similarly, memory components at different locations may store different portions of instructions 432 and collectively form a medium for storing the instructions. In some examples, device 460 may function as a thin client wherein device 410 performs all or nearly all operations that are not directly related to receiving and providing information to users via user input component 466 and display 465. Various operations described herein as being performed by a computing device may be performed by a virtual machine. By way of example, instructions 432 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Figure 5:
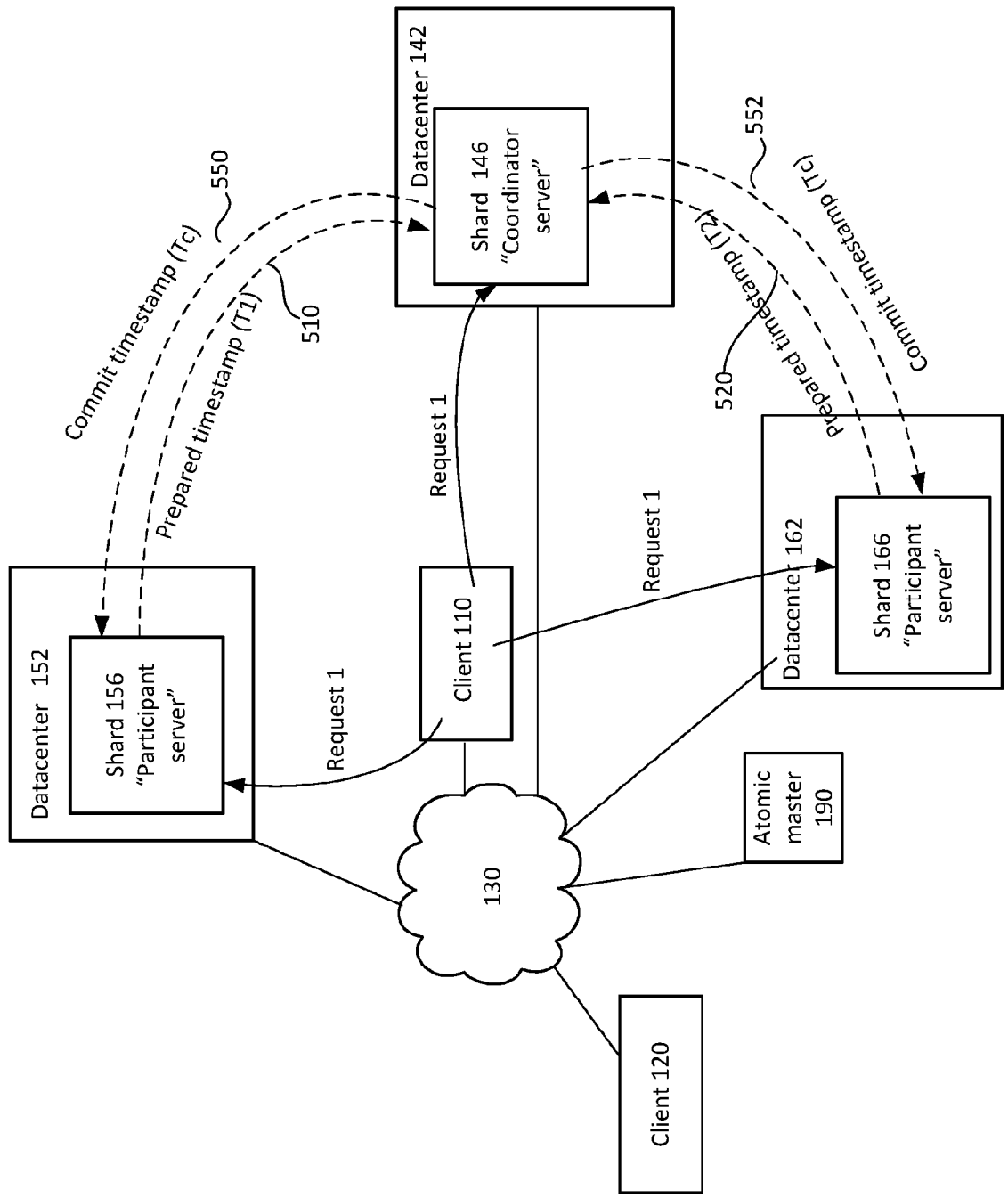
FIG. 5 is a block diagram illustrating an example system according to aspects of the disclosure.

FIG. 5 shows an example distributed system handling a multi-site transaction. A client, for example client 110, may send a request, for example, Request 1, to read and/or write a data item whose partitions are distributed at different datacenters, for example, at shards 146, 156, 166 at datacenters 142, 152, 162, respectively. For clarity, shards 146, 156, 166 in this example are shown as located at different datacenters, but as discussed above, various shards may also be stored in multiple servers in the same datacenter. The client 110 may choose one of servers storing one of the shards as a "coordinator server," for example, the server storing shard 146 at datacenter 142, while all the other servers storing the other shards of the transaction may be chosen as "participant servers," for example, the servers storing shard 156 at datacenter 152 and shard 166 at datacenter 162. When a commit message for the multi-site transaction is received at the coordinator server storing shard 146 and the participant servers storing shards 156 and 166, the coordinator server storing shard 146 and participant servers storing shards 156 and 166 may each acquire a respective lock for a time range. The time range for each of the locks may be from the time the respective locks are obtained until infinity or an upper bound. The participant servers may each locally choose a prepared timestamp (T1, T2) within the time range of the respective lock, write a prepared record, and notify the coordinator server storing shard 146, as indicated by dotted arrows 510 and 520, that they are prepared from their respective prepared timestamps (T1, T2) and onwards. The respective prepared timestamp may be chosen as the time at which the lock has been acquired locally, or alternatively may be chosen as the time at which information about the transaction has been recorded at the participant server. Instead of acquiring one lock, each of the servers may acquire multiple locks, for example, if the transaction requests changes to multiple cells of a shard, the server storing the shard may acquire a lock for each of the cells. Once the coordinator server storing shard 146 receives a prepared notification that all of the participant servers storing shards 156, 166 are prepared, the coordinator server storing shard 146 may choose a commit timestamp (Tc) equal or greater than any of the prepared timestamps (T1, T2) and any commit timestamps that it has previously assigned to other transactions, and notifies each of the participant servers storing shards 156 and 166 of the commit timestamp (Tc), as indicated by dotted arrows 550 and 552. The coordinator server storing shard 146 and each of the participant servers storing shards 156, 166 then execute the transaction at the commit timestamp (Tc).

A lock on a data item or a partition of a data item may be an exclusive lock or a shared lock. An exclusive lock does not permit any other transaction to access the same data item or partition, even if the other transactions only request a shared lock. Therefore, exclusive locks force transactions to be serialized. A shared lock on a data item or partition permits other transactions to access the same data item or partition also using shared locks. Therefore, shared locks promote parallelization of transactions, therefore increasing efficiency. A shared lock may be a reader shared lock or a writer shared lock. Writer shared locks may be used to provide efficient blind writes (e.g., writes that modify a value without reading it first), since multiple transactions may process in parallel. For example, as shown in FIG. 5, the coordinator server storing shard 146 may be configured such that it cannot choose the same commit timestamp for any other transaction for which it is also acting as a coordinator, therefore, the coordinator server storing shard 146 may take a writer shared lock.

Although in this example, the system's operations are shown with respect to shards 146, 156, and 166, the same system's operations described above would be equally applicable with respect to shard replicas, for example, server groups storing groups 148, 158, and 168, respectively, may operate the same way as shown in FIG. 5 as the servers storing shards 146, 156, and 166, respectively.

Figure 6:
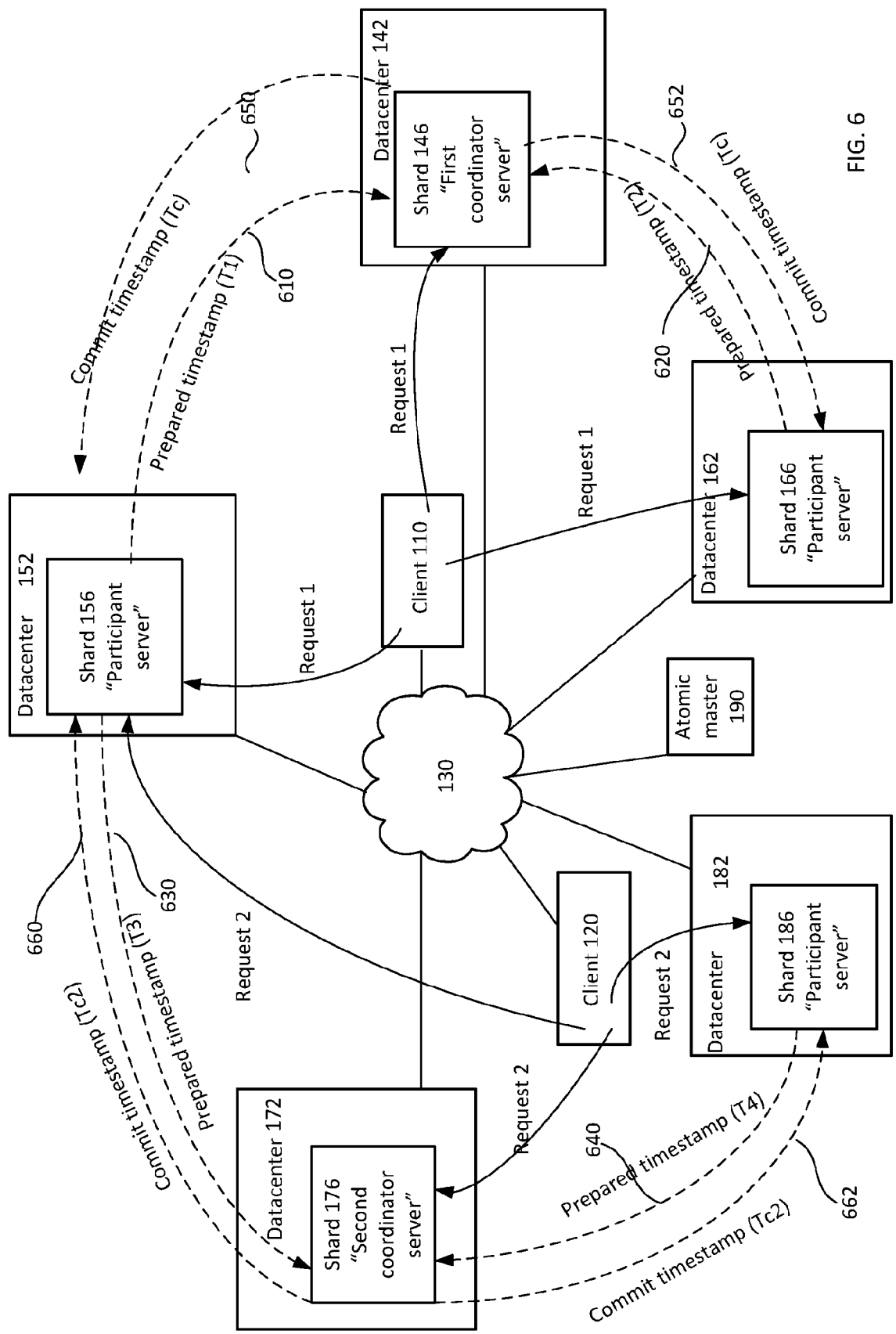
FIG. 6 is a block diagram illustrating an example system according to aspects of the disclosure.

FIG. 6 shows an example distributed system handling two multi-site transactions where two different coordinator servers share the same participant server at a shared shard. As explained above, client 110 may send Request 1 to read and/or write a data item whose partitions are distributed at different datacenters, for example, at shards 146, 156, 166 at datacenters 142, 152, 162, respectively. Client 110 chooses the server storing shard 146 at datacenter 142 as a first coordinator server, and the servers storing shard 156 at datacenter 152 and shard 166 at datacenter 162 as participant servers. Once the first coordinator server storing shard 146 receives a prepared notification from all of the participant servers storing shards 156, 166 that they are prepared at their respective timestamps (T1, T2), as indicated by dotted arrows 610 and 620, the first coordinator server storing shard 146 may choose a commit timestamp (Tc) to commit the transaction according to Request 1 and notify each of the participant servers storing shards 156 and 166 of the commit timestamp (Tc), as indicated by dotted arrows 650 and 652. However, before the transaction according to Request 1 is committed, another client, for example client 120, may also send a request, for example, Request 2, to read and/or write a data item whose partitions are distributed at different datacenters, for example, at shards 156, 176, and 186 at datacenters 152, 172, 182, respectively. Client 120 may choose the server storing shard 176 at datacenter 172 as a second coordinator server, and servers storing shard 156 at datacenter 152 and shard 186 at datacenter 182 as participant servers. The second coordinator server storing shard 172 and participant servers storing shards 156 and 186 may each take a lock for a time range. The time range for each of the locks may be from the time the respective locks are obtained until infinity or an upper bound. The participant servers storing shards 156 and 186 may each locally choose a prepared timestamp (T3, T4) within the respective time range, write a prepared record, and notify the second coordinator server storing shard 176, as indicated by dotted arrows 630 and 640, that they are prepared from their respective prepared timestamps (T3, T4) and onwards. The respective prepared timestamp may be chosen as the time at which the lock has been acquired locally, or alternatively may be chosen as the time at which information about the transaction has been recorded at the participant server. Instead of acquiring one lock, each of the servers may acquire multiple locks, for example, if the transaction requests changes to multiple cells of a shard, the server may acquire a lock for each of the cells. Once the second coordinator server storing shard 176 receives a prepared notification that participant servers storing shards 156 and 186 are both prepared, the second coordinator server storing shard 176 may choose a commit timestamp (Tc2) equal or greater than the prepared timestamps (T3, T4) and any commit timestamps that it has previously assigned to other transactions, and notify each of the participant servers storing shards 156 and 186 of the commit timestamp (Tc2), as indicated by dotted arrows 660 and 662. For clarity, shards 146, 156, 166, 176, and 186 in this example are shown as located at different datacenters, but as discussed above, various shards may also be stored in multiple servers in the same datacenter. Although in this example, the system's operations are shown with respect to shards 146, 156, 166, 176, and 186, the system's operations described above would be equally applicable with respect to shard replicas (groups).

However, there is a chance that the second coordinator server storing shard 176 chooses Tc2 that is the same as Tc chosen by the first coordinator server storing shard 146, causing a "timestamp collision" at the participant server storing shard 156, which is shared by both the first and the second coordinator servers for two different multi-site transactions. Such a timestamp collision at a shared shard at a shared participant server may cause problems. First, if the same commit timestamp is chosen for two transactions at the shared shard on the shared participant server, such as shard 156, one transaction would overwrite the other such that a read at the commit timestamp Tc would only show one of the two transactions. Another consequence is that, if there is more than one shared participant servers for the two multi-site transactions, each of the shared participant servers may choose to execute the two transactions in a different order, thereby producing inconsistent results. Although it is shown that Request 1 and Request 2 come from different clients, they may also come from the same client.

Figure 7:
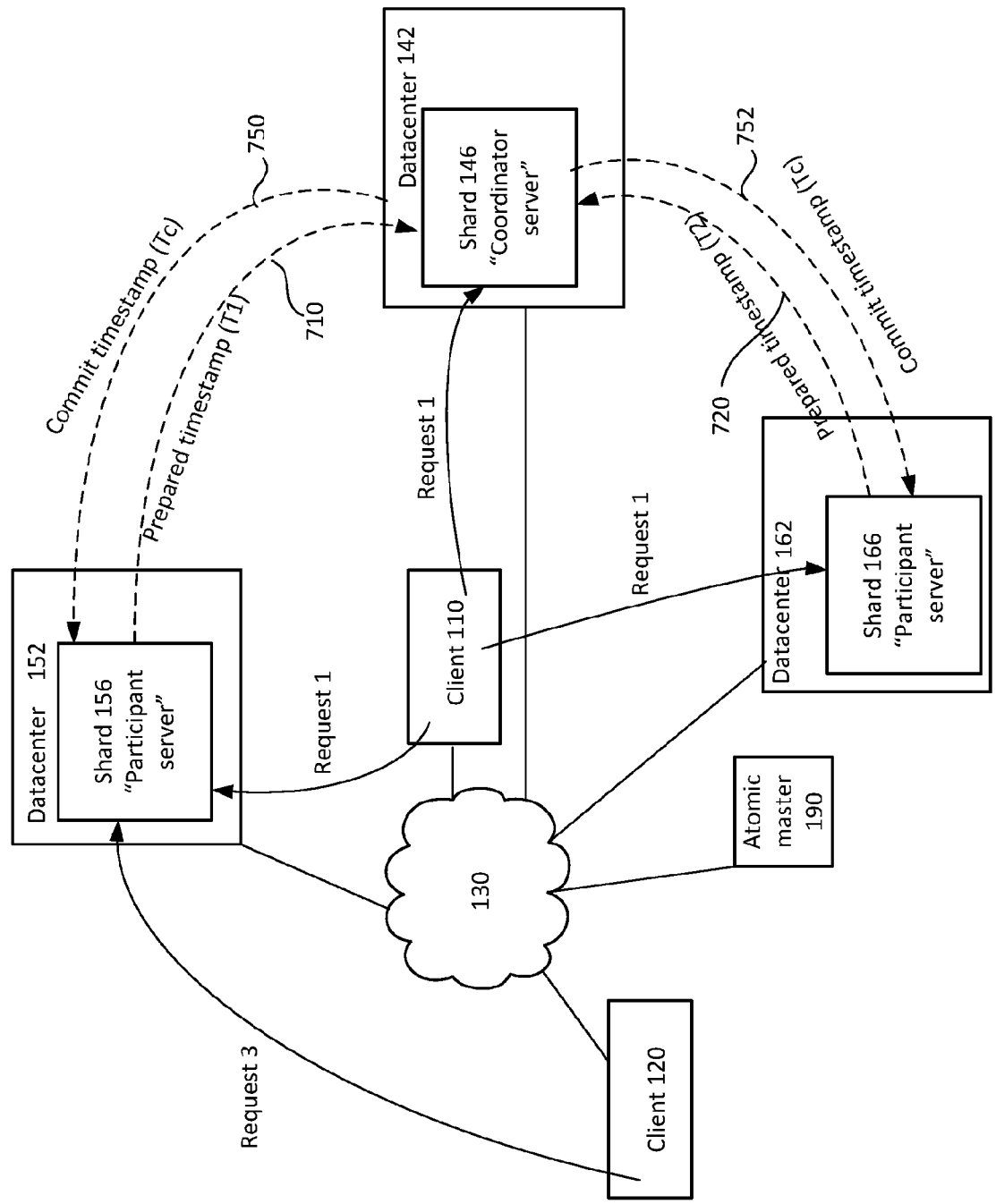
FIG. 7 is a block diagram illustrating an example system according to aspects of the disclosure.

FIG. 7 shows an example distributed system handling a multi-site transaction and a single-site transaction. As explained above, client 110 may send Request 1 to read and/or write a data item whose partitions are distributed at different datacenters, for example, at shards 146, 156, 166 at datacenters 142, 152, 162, respectively. For clarity, shards 146, 156, 166 in this example are shown as located at different datacenters, but as discussed above, various shards may also be stored in multiple servers in the same datacenter. Client 110 chooses the server storing shard 146 at datacenter 142 as a coordinator server, and the servers storing shard 156 at datacenter 152 and shard 166 at datacenter 162 as participant servers. Once the coordinator server storing shard 146 receives a prepared notification that all of the participant servers storing shards 156, 166 are prepared at their respective timestamps (T1, T2), as indicated by dotted arrows 710 and 720, the coordinator server storing shard 146 may choose a commit timestamp (Tc) to commit the transaction according to Request 1 and notify each of the participant servers storing shards 156 and 166 of the commit timestamp (Tc), as indicated by dotted arrows 750 and 752. However, another client, for example client 120, may also send a request, for example Request 3, to read and/or write some data item stored only at shard 156 at datacenter 152. A timestamp collision may also occur in this situation, if the participant server storing shard 156 chooses a commit timestamp (Tc3) for the single-site transaction according to Request 3 that happens to be the same as Tc chosen by the coordinator server storing shard 146. As discussed above, one negative consequence of such a timestamp collision is that one transaction would overwrite the other such that a read at the commit timestamp Tc would only show one of the two transactions. Although it is shown that Request 1 and Request 3 come from different clients, they may also come from the same client.

Figure 8:
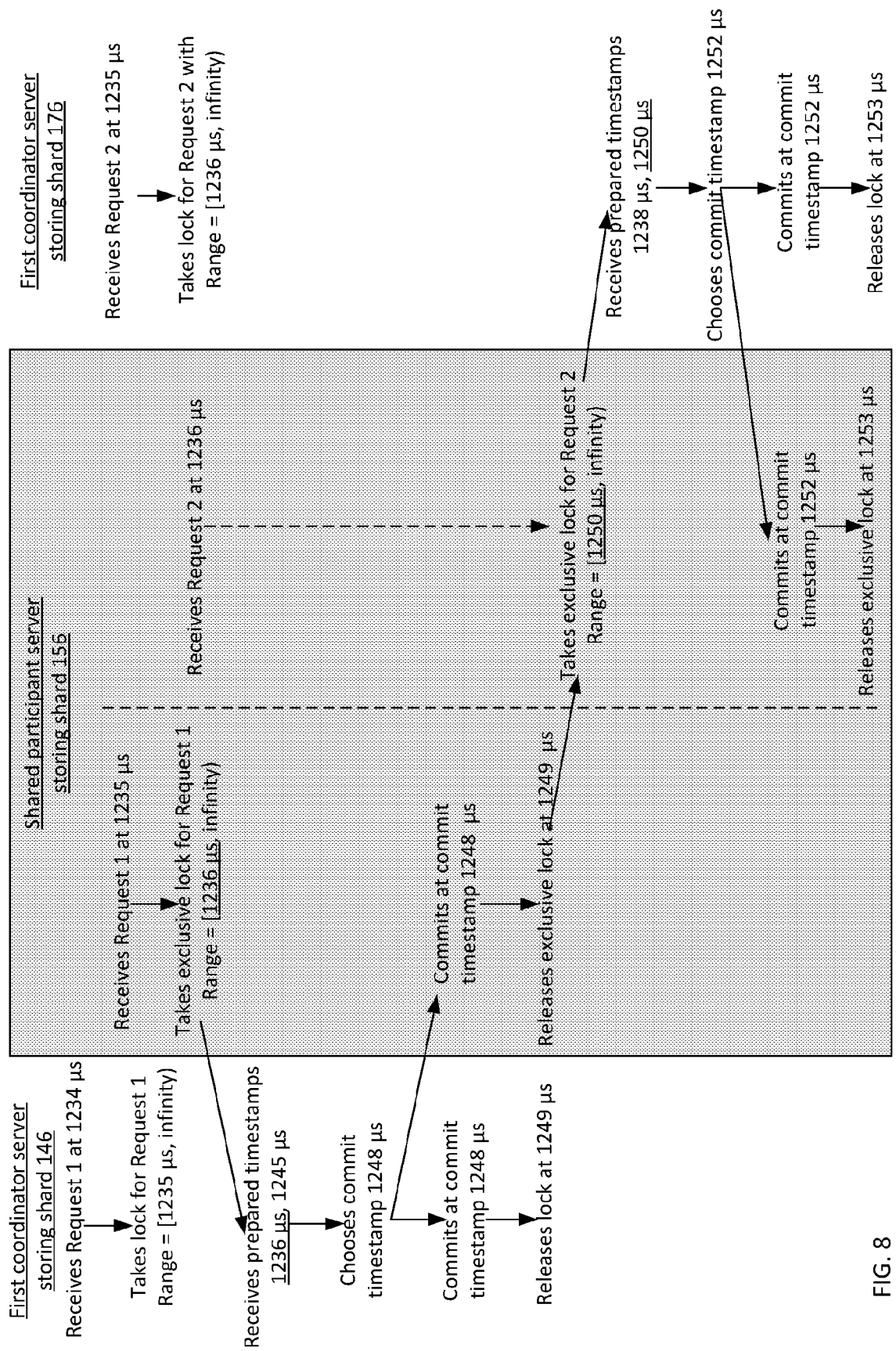
FIG. 8 is a block diagram illustrating an example system according to aspects of the disclosure.

FIG. 8 shows an example distributed system configured to prevent a timestamp collision between two multi-site transactions at a shared participant server as shown in FIG. 6 by only allowing participant servers to take exclusive locks. For clarity, only the first coordinator server storing shard 146, the second coordinator server storing shard 176, and their shared participant server storing shard 156 are shown. The sequence of events at each server is depicted chronologically from top to bottom. The dotted line at the center separates events for Request 1 (left hand side) from events for Request 2 (right hand side). Further, the shaded region in the center shows events occurring at the shared participant server storing shard 156, some of which are for Request 1 (left hand side of shaded region) and others are for Request 2 (right hand side of shaded region). The unshaded region on the left of the shaded region shows events at the first coordinator server storing shard 146 and the unshaded region on the right of the shaded region shows events at the second coordinator server storing shard 176. Starting from the left hand side, Request 1 was received at the first coordinator server storing shard 146 at time 1234 μs and at shared participant server storing shard 156 at time 1235 μs. The first coordinator server storing shard 146 takes a lock for Request 1 with a time range from time 1235 μs to infinity. The shared participant server storing shard 156 then takes an exclusive lock for Request 1 with a time range from time 1236 μs until infinity. This is because at this point, the shared participant server storing shard 156 does not know what commit timestamp the first coordinator server storing shard 146 will ultimately choose. The shared participant server storing shard 156 sends its prepared timestamp (T1) of 1236 μs to the first coordinator server storing shard 146. The first coordinator server storing shard 146 may also receive other prepared timestamps from other participant servers, such as time 1245 μs (T2) from participant server storing shard 166 (not shown here, shown in FIG. 6). The first coordinator sever storing shard 146 then chooses a commit timestamp (Tc), for example, 1248 μs, that is larger than both of the two prepared timestamps received (T1, T2) and any commit timestamps that the first coordinator server storing shard 146 has previously assigned to other transactions. The first coordinator server storing shard 146, the shared participant server storing shard 156, and the participant server storing shard 166 (not shown here, shown in FIG. 6) each commits the transaction of Request 1 at commit timestamp 1248 μs. After that, the shared participant server storing shard 156 releases its exclusive lock for Request 1 at time 1249 μs.

Moving to the right hand side, although Request 2 was received at the second coordinator server storing shard 176 at time 1235 μs and at the shared participant server at time 1236 μs, and the second coordinator server storing shard 176 took a lock for Request 2 with a time range from time 1236 μs to infinity, because the shared participant server storing shard 156 had an exclusive lock for Request 1 and did not release it until time 1249 μs, nothing has happened for Request 2 at the shared participant server for shard 156 before time 1249 μs. The exclusive lock for Request 1 thus prevented shared participant server storing shard 156 from choosing a prepared timestamp (T3) for Request 2 that is smaller or equal to the commit timestamp (Tc) of Request 1, and since the second coordinator server storing shard 176 must choose a commit timestamp (Tc2) equal or greater than all the prepared timestamps it receives, this ensures that the second coordinator server storing shard 176 will choose a commit timestamp (Tc2) greater than the commit timestamp (Tc) for Request 1. Only when the exclusive lock was released at time 1249 µs, does the shared participant server storing shard 156 take an exclusive lock for Request 2 with a time range from 1250 µs to infinity, and sends the prepared timestamp (T3) of 1250 µs to the second coordinator server storing shard 176. Once the second coordinator server storing shard 176 receives all the other prepared timestamps, for example, prepared timestamp (T4) of 1238 µs from the participant server storing shard 186 (not shown here, shown in FIG. 6), it chooses commit timestamp (Tc2), for example at time 1252 µs, that is larger than both prepared timestamps (T3, T4) received and any commit timestamps that the second coordinator server storing shard 176 has previously assigned to other transactions. The second coordinator server storing shard 176, the shared participant storing shard 156, and the participant server storing shard 186 each commits the transaction of Request 2 at the commit timestamp (Tc2) at 1252 µs. After that, the shared participant server storing shard 156 releases its exclusive lock for Request 2 at time 1253 µs. As illustrated by the dotted arrow, during the exclusive lock for Request 1, parallel processing cannot be done for Request 2 at the shared participant shard 156. Likewise, parallel processing would not have been possible at the shared participant server for shard 156 during the exclusive lock for Request 2. The locks taken by the first and second coordinator servers may be exclusive or shared.

Instead of taking an exclusive lock with a range up to infinity, another example system may be configured such that the participant server takes an exclusive lock up to a predetermined upper bound. For example, the client may specify a maximum commit timestamp for the transaction. If the transaction does not commit by the maximum commit timestamp specified by the client, the transaction may be aborted. In this case, the upper bound for the time ranges mentioned earlier could be the client-specified maximum commit timestamp.

Figure 9:
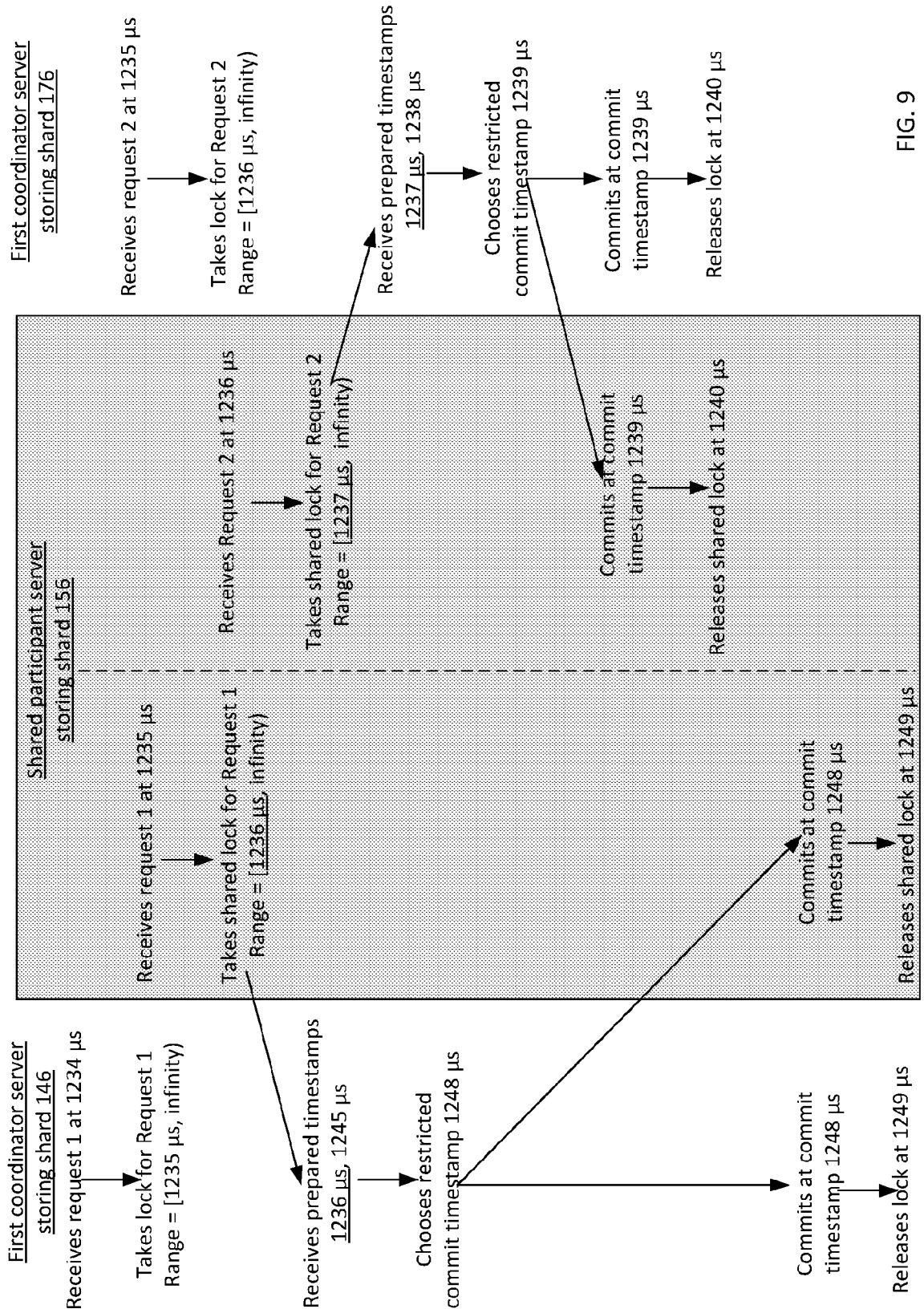
FIG. 9 is a block diagram illustrating an example system according to aspects of the disclosure.

FIG. 9 shows another example distributed system configured to prevent a timestamp collision between two multi-site transactions as shown in FIG. 6 by applying restrictions to commit timestamps in such situations. For clarity, only the first coordinator server storing shard 146, the second coordinator server storing shard 176 and their shared participant server storing shard 156 are shown. The sequence of events at each server is depicted chronologically from top to bottom. The dotted line at the center separates events for Request 1 (left hand side) from events for Request 2 (right hand side). Further, the shaded region in the center shows events occurring at the participant server storing shard 156, some of which are for Request 1 (left hand side of shaded region) and others are for Request 2 (right hand side of shaded region). The unshaded region on the left of the shaded region shows events at the first coordinator server storing shard 146 and the unshaded region on the right of the shaded region shows events at the second coordinator server storing shard 176. On the left hand side, Request 1 is received at the first coordinator server storing shard 146 at time 1234 µs and at the shared participant server storing shard 156 at time 1235 µs; on the right hand side, Request 2 µs received at the second coordinator server storing shard 176 at 1235 µs and at the participant server storing shard 156 at time 1236 µs. On the left hand side, the first coordinator server storing shard 146 takes a lock for Request 1 with a time range from time 1235 µs to infinity; on the right hand side, the second coordinator server storing shard 176 takes a lock for Request 2 with a time range from time 1236 µs to infinity. Next, on the left hand side, the shared participant server storing shard 156 takes a shared lock for Request 1 with a time range starting at time 1236 µs until infinity and send its prepared timestamp (T1) of 1236 µs to the first coordinator server storing shard 146; on the right hand side, the shared participant server storing shard 156 takes a shared lock for Request 2 with a time range starting at time 1237 µs until infinity and send its prepared timestamp (T3) of 1236 µs to the second coordinator server storing shard 176. Each of the first and second coordinator servers may receive other prepared timestamps from other participant servers too, on the left hand side, the first coordinator server storing shard 146 also receives prepared timestamp (T2) of 1245 µs from the participant server storing shard 166 (not shown here, shown in FIG. 6); on the right hand side, the second coordinator server storing shard 176 also receives prepared timestamp (T4) of 1238 µs from the participant server storing shard 186 (not shown here, shown in FIG. 6). Similarly as discussed above with respect to FIG. 8, instead of taking locks up to infinity, alternatively the locks may be taken up to a predetermined upper bound. The locks taken by the first and second coordinator servers may be exclusive or shared.

To prevent a timestamp collision, the first and second coordinator servers may each assume that at least one of the participant servers in their respective multi-site transactions is shared with another coordinator server, and that there may be at least one shared shard on the shared participant server, and chooses a restricted commit timestamp for their respective multi-site transactions. In the current example, participant server storing shard 156 is a shared participant, and shard 156 is the shared shard for Request 1 and Request 2. The first and second coordinator servers then each chooses a restricted commit timestamp for their respective transactions such that any other coordinator sharing the participant server storing shard 156 cannot select the same commit timestamp for another transaction, even if it were allowed to take a shared lock on behalf of that transaction. Alternatively, the participant servers in a transaction, such as participant server storing shard 156 in Request 1, may be configured to notify the coordinator server in that transaction, such as the first coordinator server storing shard 146 in Request 1, when it is being shared with another coordinator server for another transaction at a shared shard, such as the second coordinator server storing shard 176 of Request 2, and only when notified, the coordinator servers, such as the first and second coordinator servers, may choose a restricted commit timestamp for their respective transactions. By restricting the commit timestamps that coordinator servers may choose, the participant servers may take shared locks, instead of exclusive locks, which increases the efficiency of the system.

In one example, the commit timestamp may be restricted by a hash value of a transaction ID, where the transaction ID is unique to the transaction. For example, the commit timestamp for a transaction may be restricted such that its lower N-bits (e.g., 3-bits, 6-bits, 10-bits, 20-bits, etc.) must equal to a hash value of the transaction ID. Referring again to FIG. 9, if Request 1 has a transaction ID that hashes to 100000, and the commit timestamp (Tc) is restricted such that its lower 6-bits must equal to the hash value of the transaction ID of Request 1, then the commit timestamps (Tc) for Request 1 are restricted to 1248 μs (or 10011100000), 1312 μs (or 10100100000), 1376 μs (or 10101100000), etc. The first coordinator server storing shard 146 is configured to compute a maximum of all the prepared timestamps it received from the participant servers of Request 1 and any commit timestamps it has previously assigned to other transactions, and then computes the next timestamp higher than this maximum that also has its lower 6-bits equal to 100000. Similarly, if Request 2 has a transaction ID that hashes to 010111, and the commit timestamp (Tc2) is restricted such that its lower 6-bits must equal to the hash value of the transaction ID of Request 2, then the commit timestamps (Tc2) for Request 2 are restricted to 1239 μs (or 10011010111), 1303 μs (or 10100010111), 1367 μs (or 10101010111), etc. The second coordinator server storing shard 176 is configured to compute a maximum of all the prepared timestamps it received from the participant servers of Request 2 and any commit timestamps it has previously assigned to other transactions, and then computes the next timestamp higher than this maximum that also has its lower 6-bits equal to 010111. Here, the first coordinator server storing shard 146 chooses commit timestamp (Tc) of 1248 μs and the second coordinator server storing shard 176 chooses commit timestamp (Tc2) at 1239 μs. Request 1 μs then committed at the first coordinator server storing shard 146, shared participant server storing shard 156, and participant server storing shard 166 at 1248 μs. Request 2 μs committed at the second coordinator server storing shard 176, shared participant server storing shard 156, and participant server storing shard 186 at 1239 μs. Once the transactions are committed, each of the servers then releases their respective lock. Thus, this example system is configured to ensure that the transaction according to Request 1 and the transaction according to Request 2 cannot commit at the same commit timestamp.

It is still possible, however, that two unique transaction IDs may hash to the same value, causing a "hash collision," which may in turn cause a timestamp collision, since the commit timestamps for the two transaction would be subject to the same restriction. The probability of collision depends on the value of N. For example, if N=0, meaning that there is no restriction, then a collision would occur at a shared participant server for two transaction if both coordinator servers choose to commit at the same time; if N=6, then a collision would occur at a shared participant server for two transactions only if the 6-bit hash values of the two transaction IDs are the same and both of the coordinator servers commit at the same time; if N=10, then a collisions would occur at a shared participant server for two transactions only if the 10-bit hash values of the two transaction IDs are the same and both of the coordinator servers commit at the same time; and so on. Therefore, by choosing a larger N, the probability of collision would be decreased. However, choosing a larger N has a trade off, as N gets larger, the spacing between available commit timestamps for the coordinator server also increase, therefore, choosing a larger N also means that the coordinator server might have to wait longer to choose a commit timestamp. For example, if N=0, the coordinator server may choose any time equal or larger than the prepared timestamps as the commit timestamp; if N=6, the coordinator server must wait to choose the next commit timestamp that has the 6-bit hash pattern, which could be up to 64 μs; if N=10, the coordinator server must wait to choose the next commit timestamp that has the 10-bit hash pattern, which could be up to 1.024 ms; and so on. Thus, the value of N may be optimally chosen according to specifics of the distributed system, for example, the desired latency and throughput of the system. To achieve a lower latency, N may be lowered so that the coordinator does not have to wait a long time. To achieve a higher throughput, more transactions need to be processed in parallel and allowed to share locks, therefore, N may be increased to prevent collisions between the many parallel transactions.

One example system is configured to prevent a timestamp collision in such situations by using exclusive locks. For example, if transaction ID for Request 1 and transaction ID for Request 2 both hashes to the same value of 100000, an exclusive lock may be taken for Request 1 by the shared participant server at shard 156, as depicted on the left hand side of FIG. 8. However, once the exclusive lock is released at time 1249 μs, meaning that the transaction according to Request 1 that was causing the hash collision has been completed, the shared participant server storing shard 156 may proceed with Request 2 with a shared lock in the same way as depicted on the right hand side of FIG. 9.

Another example system configured to prevent a timestamp collision in a hash collision situation does so by only allowing the shared participant server to take a writer-shared restrictive lock for one transaction, and put the other transaction in a waiting queue until the participant server releases the writer-shared restrictive lock on the first transaction. For example, referring to FIG. 9, the shared participant server storing shard 156 may proceed with Request 1 as depicted on the left hand side of FIG. 9 by taking a writer-shared restrictive lock for Request 1, and places Request 2 in a waiting queue until shared participant server storing shard 156 releases the writer-shared restrictive lock at time 1249 μs. The writer-shared restrictive lock may prevent other transactions having the same hash value (in this example, having the same restricted commit timestamp bit-pattern) from taking a lock at the shared participant server at shard 156, but allow other transactions having different hash values (in this example, having different restricted commit timestamp bit-patterns) to take writer-shared locks at the shared participant server at shard 156. This ensures that shared participant server storing shard 156 would choose a prepared timestamp (T3) for Request 2 that is greater than the commit timestamp (Tc) of Request 1, which ensures that the commit timestamp (Tc2) for Request 2 would be greater than the commit timestamp (Tc) of Request 1. Further, since writer-shared restrictive locks, instead of exclusive locks, are used in this example, efficiency is increased as a result of allowing parallel processing of transactions having different hash values.

Another aspect of this example system restricting commit timestamps by a hash value of a transaction ID relates to efficiency. For example, if a coordinator server receives multiple requests for multi-site transactions involving a shared participant server, the coordinator server would have to choose a restricted commit timestamp for each of these multi-site transactions. As seen in the example above depicted in FIGS. 6 and 9, Request 1 chose the server storing shard 146 as the coordinator server and commit timestamps (Tc) for Request 1 are restricted to 1248 μs (or 10011100000), 1312 μs (or 10100100000), 1376 μs (or 10101100000), etc., suppose there is also a Request 4 that also chose the server storing shard 146 as the coordinator server with commit timestamps (Tc4) restricted to 1281 μs (or 10100000001), 1345 μs (or 10101000001), 1473 μs (or 10111000001), etc., another Request 5 that also chose the server storing shard 146 as the coordinator server with commit timestamps (Tc5) restricted to 1258 μs (or 10011101010), 1322 μs (or 10100101010), 1386 μs (or 10101101010), etc., and yet another Request 6 that chose the server storing shard 146 as the coordinator with commit timestamps (Tc6) restricted to 1280 µs (or 10100000000), 1344 µs (or 10101000000), 1472 µs (or 10111000000), etc. Thus, if the coordinator server storing shard 146 chooses to commit the transactions in the order of Request 1-Request 4-Request 5-Request 6, the commit timestamps would be 1248 µs, 1281 µs, 1322 µs, 1344 µs with a total spacing of 33 µs+41 µs+22 µs=964 µs; but if the coordinator server storing shard 146 chooses to commit the transactions in the order of Request 5-Request 4-Request 1-Request 6, the commit timestamps would be 1258 µs, 1281 µs, 1312 µs, 1344 µs, with a total spacing of 23 µs+31 µs+32 µs=86 µs, and so on. Thus, the order that the timestamps are chosen have an effect on the efficiency.

In one example, a server that receives requests to commit multiple transactions with restricted commit timestamps and for which it is functioning as a coordinator may choose a commit timestamp for each of the transactions such that a total spacing between all the commit timestamps is substantially minimized. For example, continuing from the example above, the coordinator server storing shard 146 may first determine that the smallest commit timestamp that it may choose for all the transactions to be committed is 1248 µs for Request 1. The coordinator server storing shard 146 then arranges the lower 6-bits patterns for the other transactions, Requests 4, 5, 6, in an increasing order, which is 000000 (Request 6), 000001 (Request 4), 101010 (Request 5). The coordinator server storing shard 146 then rotates the first 6-bit pattern to the back of the ordered list until the first 6-bit pattern in the list is greater than the lower 6-bits pattern of Request 1. Thus, after 2 rotations, the list becomes 101010 (Request 5), 000000 (Request 6), 000001 (Request 4). The coordinator server storing shard 146 then chooses the next three commit timestamps in the order corresponding to this list, Request 5-Request 6-Request 4. This substantially minimizes the wait time between transactions at the same coordinator server and thus the latency with which transactions commit, therefore increasing overall efficiency. In the above example, if the coordinator server storing shard 146 chooses timestamps in the order of Request 1-Request 5-Request 6-Request 4, the commit timestamps would 1248 µs, 1258 µs, 1280 µs, 1281 µs, with a total spacing of 10 µs+22 µs+1=33 µs. The ordering method described above is not limited to ordering multi-site transactions, if the coordinator server also received requests to commit single-site transactions, the coordinator server may order the single-site transactions along with the multi-site transactions to substantially minimize a total spacing between all the commit timestamps, therefore further increasing overall efficiency.

In other example systems, instead of commit timestamps being restricted by transaction IDs, coordinator servers that share a participant server may be restricted in other ways when selecting a commit timestamp such that any other coordinator server sharing the participant at a shared shard cannot select the same commit timestamp for another transaction, even if it were allowed to take a shared lock on behalf of that transaction. For example, the commit timestamps may be restricted by a coordinator server ID identifying the coordinator server in a similar fashion as described above with respect to transaction ID. For another example, coordinator servers with shared participant servers may be configured to communicate with each other to ensure that unique commit timestamps are chosen. For example, coordinator servers that share a participant server may send messages to each other to agree on different commit timestamps for their respective transactions. In another example system, a global manager may choose all commit timestamps to ensure that commit timestamps are unique.

Figure 10:
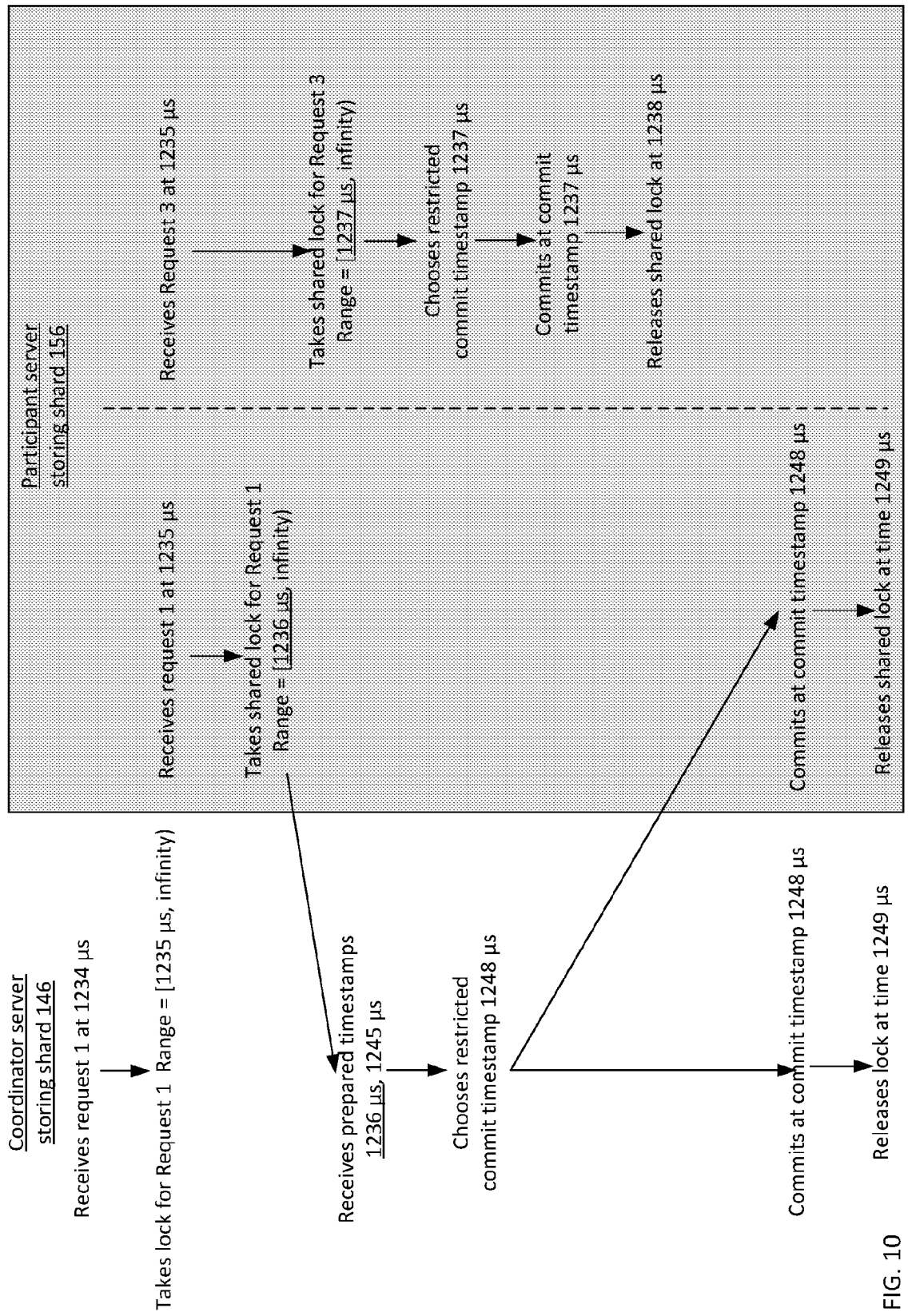
FIG. 10 is a block diagram illustrating an example system according to aspects of the disclosure.

FIG. 10 shows an example distributed system configured to prevent a timestamp collision between a multi-site transaction and a single-site transaction as shown in FIG. 7, by applying restrictions to commit timestamps in such situations at the participant. For clarity, only one coordinator server storing shard 146 and one participant server storing shard 156 are shown. The sequence of events at each server is depicted chronologically from top to bottom. The dotted line at the center separates events for Request 1 (left hand side) from events for Request 2 (right hand side). Further, the shaded region in the center shows events occurring at the participant server storing shard 156, some of which are for Request 1 (left hand side of shaded region) and others are for Request 2 (right hand side of shaded region). The unshaded region on the left of the shaded region shows events at the coordinator server storing shard 146. On the left hand side, Request 1 for a multi-site transaction was received at coordinator server storing shard 146 at time 1234 µs and participant server storing shard 156 at time 1235 µs; on the right hand side, Request 3 for a single-site transaction was received at participant server storing shard 156 at time 1235. The coordinator server storing shard 146 takes a lock for Request 1 with a time range from time 1235 µs to infinity. Next, on the left hand side, the participant server storing shard 156 takes a shared lock for Request 1 for a time range starting at time 1236 µs until infinity and sends the prepared timestamp (T1) of 1236 µs to coordinator server storing shard 146; on the right hand side, the participant server storing shard 156 then takes a shared lock for Request 3 for a range starting at time 1237 µs until infinity. The coordinator server storing shard 146 may receive prepared timestamps from all other participant servers too, such as prepared timestamp (T2) of 1245 µs from participant server storing shard 166 (not shown here, shown in FIG. 7). Similarly as discussed above with respect to FIG. 8, instead of taking locks up until infinity, alternatively the locks may be taken from up to a predetermined upper bound. The lock taken by the coordinator server storing shard 146 may be exclusive or shared.

The coordinator server storing shard 146 may choose a commit timestamp (Tc), for example 1248 µs, which is greater or equal to any of the prepared timestamps (T1, T2) it received and any commit timestamps it has previously assigned to other transactions, and has a lower 6-bit pattern of 100000. However, on the right hand side, as discussed above, if the participant server storing shard 156 freely chooses any commit timestamp (Tc3) for single-site transaction according to Request 3, there is a chance that the participant server storing shard 156 chooses the same commit timestamp (Tc) for Request 1 chosen by the coordinator server storing shard 146. To avoid such a timestamp collision between a multi-site transaction and a single-site transaction at a participant server, the participant server may be configured to choose a restricted commit timestamp for the single-site transaction that a coordinator server would not choose for the multi-site transaction at that participant server.

In one example, the commit timestamp for the single-site transaction may be restricted by a hash value of a transaction ID of the single-site transaction. For example, the participant server storing shard 156 may require that the commit timestamp (Tc3) for the single-site transaction to have its lower N-bits (e.g., 3-bits, 6-bits, 10-bits, 20-bits, etc.) equal to a hash value of a transaction ID of the single-site transaction. Referring again to FIG. 10, if Request 3 has a transaction ID that hashes to 010101, and the commit timestamp is restricted such that its lower 6-bits must equal to the hash value of the transaction ID, then the commit timestamps for Request 3 are restricted to 1237 µs (or 10011010101), 1301 µs (or 10100010101), 1365 µs (or 10101010101), etc. Request 1 µs then committed at coordinator server storing shard 146 and participant server storing shard 156 at 1248 µs. Request 3 µs committed at participant server storing shard 156 at 1237 µs. After the transactions are committed, the servers each release their respective lock. As noted above, such an example system ensures that the transaction according to Request 1 and the transaction according to Request 3 would not commit at the same commit timestamp as transaction according to Request 1.

In an alternative example, the distributed system may be configured such that it treats single-site transactions differently from multi-site transactions to completely eliminate timestamp collisions between multi-site and single-site transactions. For example, instead of simply requiring that the commit timestamp for a multi-site transaction having a shared participant server to have lower N-bits equal to a hash value of the transaction ID, a coordinator server may require that commit timestamps for such multi-site transactions must have lower N bits=hash (transactionID) % $2^N-1$. This way, multi-site transactions are never allowed to choose a commit timestamp with lower N-bits (e.g., 3-bits, 6-bits, 10-bits, 20-bits, etc.) equal to $2^N-1$, which may be reserved exclusively for single-site transactions. Referring to FIG. 10 again, since N=6, the single-site transaction according to Request 3 may only choose commit timestamps having lower 6 bits of $2^6-1$ (or 111111), which means the commit timestamps for Request 3 are restricted to 1279 µs (or 10011111111), 1535 µs (or 10111111111), 2047 µs (or 11111111111), etc. In this example, since single-site transactions are required to have commit timestamps that follow an exclusive pattern different from all multi-site transactions, this may increase efficiency by eliminating the need to deal with possible timestamp collisions between single-site and multi-site transactions.

The commit timestamps of a distributed database may be provided to a user in one or more columns of a table that the user may view. For example, when a user requests a change to a data item in one or more main tables kept in the distributed database, the user may also want to record the change in another table that keeps track of all changes made in the main tables (a "change log"). For example, the user may request a transaction to modify some data item in the main table, and also include in that transaction a mutation to record the transaction in the change log. In such a change log, commit timestamps may be included in a primary key column, meaning that the commit timestamps must be unique, or some other column.

Figure 11:
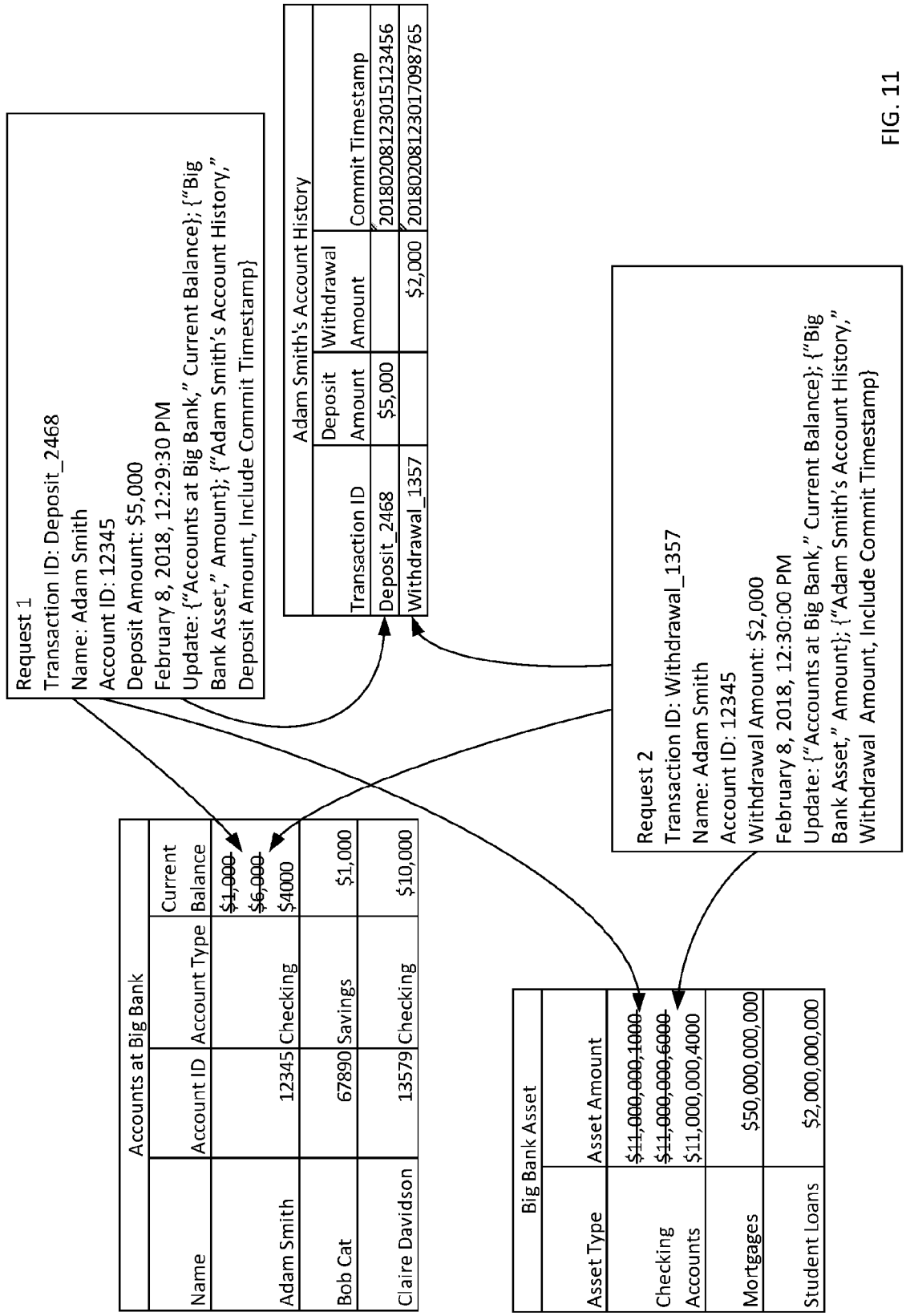
FIG. 11 is a pictorial diagram illustrating an example system according to aspects of the disclosure.

FIG. 11 shows an example distributed system. Here, a user of the distributed database is Big Bank, who maintains a number of tables distributed at multiple shards or groups, such as shards 146, 156, 166. One table that Big Bank maintains, "Accounts at Big Bank," is a summary of all accounts at Big Bank, which includes information such as Name of the account holder, the Account ID, the Account Type, and the Current Balance. Big Bank also maintains a change log for each of its accounts to keep track of all deposits and withdrawals made to the account. For example, a change log "Adam Smith's Account History" keeps a record of all deposits and withdrawals made to Adam Smith's account. Another table that Big Bank maintains is "Big Bank Assets," which is a summary of the Bank's various assets, including Asset Type and Asset Amount.

The example in FIG. 11 further shows that Big Bank sends two requests, Request 1 and Request 2, to change certain data maintained in its database. Request 1, made on Feb. 8, 2018, at 12:29:30 PM, is a deposit to Adam Smith's account for $5,000; Request 2, made on the same day at 12:30:00 PM, is a withdrawal from Adam Smith's account for $2,000. Requests 1 and 2 both require that the Current Balance for Adam Smith in the table Accounts at Big Bank to be updated. For example, if Adam Smith's Current Balance before Request 1 was committed was $1,000, after Request 1 was completed the Current Balance would be $6,000, and after Request 2 was committed the Current Balance would be $4,000. Requests 1 and 2 also both require that the table Big Bank Asset to update the total amount of Checking Accounts at Big Bank. For example, Request 1 increases Amount for Checking Accounts by $5,000 and Request 2 reduces Amount for Checking Accounts by $2,000. Finally, Requests 1 and 2 both require that the table Adam Smith's Account History to be updated with the addition of these two transactions. For Adam Smith's Account History, Request 1 and Request 2 both also include an instruction to include commit timestamp, therefore, a column in Adam Smith's Account History would have the commit timestamp for Requests 1 and 2 inserted, which would be the time that all three tables—Accounts at Big Bank, Big Bank Assets, and Adam Smith's Account History—were updated according to Requests 1 and 2.

As shown in FIG. 11, commit timestamps of each transaction is provided in a column of Adam Smith's Account History, for example, 20180208123015123456 is the commit timestamp at which all three tables—Accounts at Big Bank, Big Bank Assets, and Adam Smith's Account History—were updated according to Request 1, and 20180208123017098765 is the commit timestamp at which all three tables were updated according to Request 2. Because the sequence of transactions is particularly important for bank transactions (for example, processing Request 2 before Request 1 would result in a negative balance for Adam Smith), here the commit timestamps are provided as primary key of Adam Smith's Account History. In another example, a placeholder may be placed in the commit timestamp column of Adam Smith's Account History as a request was made, and the value is updated once the commit timestamp is chosen.

In a distributed system, for example as shown in FIG. 5, Accounts at Big Bank may be at shard 146, Adam Smith's Account History may be at shard 156, and Big Bank Assets may be at shard 166. For Request 1, Big Bank may choose the server storing shard 146 as the first coordinator server and the servers storing shards 156 and 166 as the participant servers, while for Request 2, Big Bank may choose the server storing shard 166 as the second coordinator server and the servers storing shards 146 and 156 as the participant servers. If the first coordinator server storing shard 146 chooses a same commit timestamp for Request 1 as the second coordinator server storing shard 166 chooses for Request 2, at shared participant server storing shard 156, the same commit timestamp would be entered for both transaction of Request 1 and transaction of Request 2. Because commit timestamp is the primary key of Adam Smith's Account History, same commit timestamp is not allowed for multiple rows, thus, one transaction would overwrite the other transaction and Adam Smith's Account History would not accurately represent the entire history of Adam Smith's account.

As discussed above, unique commit timestamps may be achieved by one of the various example systems discussed above and illustrated in FIGS. 8-10. Although in the above example, the change log is at one shard, the change log may also be at multiple shards, but the example systems discussed above with respect to FIG. 8-10 would be equally applicable. Likewise, in another example, the user may request a transaction that spans multiple databases, and include in that transaction request a mutation to update a separate change log for each database, and the example systems discussed above with respect to FIG. 8-10 would be equally applicable. For example, continuing from the example in FIG. 11, a transfer from Adam Smith's account to Bob Cat's account may require an update to the change log Adam Smith's Account History at shard 156 as well as an update to a change log Bob Cat's Account History at shard 176.

Example Methods

Figure 12:
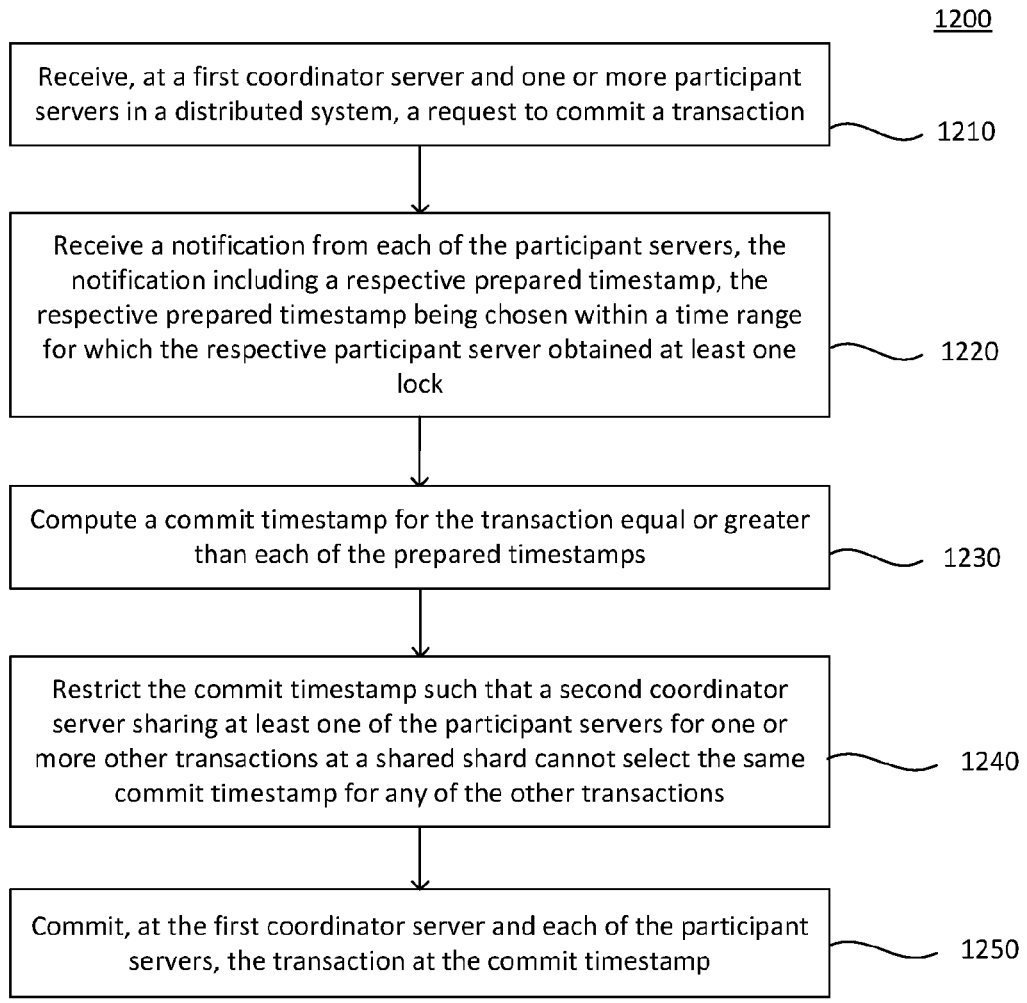
FIG. 12 is a flow chart illustrating an example method according to aspects of the disclosure.

FIG. 12 illustrates an example method 1200 for providing unique commit timestamps to users. It should be understood that the following operations do not have to be performed in the precise order described below. Rather, various steps may be handled in a different order or simultaneously. Steps may also be added or omitted unless otherwise stated.

In block 1210, a request to commit a transaction is received at a first coordinator server and one or more participant servers in a distributed system.

In block 1220, a notification from each of the participant servers is received at the coordinator server, the notification including a respective prepared timestamp, the respective prepared timestamp being chosen within a time range during which the respective participant server obtained at least one lock.

In block 1230, a commit timestamp for the transaction equal or greater than each of the prepared timestamps is computed.

In block 1240, the commit timestamp is restricted such that a second coordinator server sharing at least one of the participant servers for one or more other transactions at a shared shard cannot select the same commit timestamp for any of the other transactions.

In block 1250, the transaction is committed at the commit timestamp at the first coordinator server and each of the participant servers.

The technology is advantageous because it provides meaningful commit timestamps to users without significantly compromising the throughput of a distributed database. Although the user's database may be highly distributed, the user may use the commit timestamps to view changes made to various data items as if the database was kept on a single machine. The technology further provides various methods to increase efficiency, for example, by avoiding exclusive locks, minimizing spacing between commit timestamps, and providing different treatments for multi-site and single-site transactions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method, comprising:
   receiving, at a first coordinator server and one or more participant servers in a distributed system, a request to commit a transaction;
   receiving a notification from each of the participant servers, the notification including a respective prepared timestamp, the respective prepared timestamp being chosen within a time range for which the respective participant server obtained at least one lock;
   computing a commit timestamp for the transaction equal or greater than each of the prepared time stamps;
   restricting the commit timestamp such that a second coordinator server sharing at least one of the participant servers for one or more other transactions at a shared shard cannot select the same commit timestamp for any of the other transactions; and
   committing, at the first coordinator server and each of the participant servers, the transaction at the commit timestamp.

2. The method according to claim 1, wherein the at least one lock is a writer shared lock.

3. The method according to claim 1, further comprising:
   computing a hash value of a transaction ID of the transaction; and
   further restricting the commit timestamp for the transaction by the hash value of the transaction ID.

4. The method according to claim 3, wherein further restricting the commit timestamp comprises setting a predetermined number of lower bits of the commit timestamp to be equal to the hash value of the transaction ID.

5. The method according to claim 3, further comprising:
   determining, at the shared participant server, that the hash value of the transaction ID is equal to a hash value of a transaction ID of at least one of the other transactions; and
   preventing, at the shared participant server, at least one of the other transactions having the same hash value from taking a lock until the transaction commits.

6. The method according to claim 1, further comprising:
   determining that the first coordinator server received one or more requests to commit other transactions; and
   computing a commit timestamp for each of the other transactions received at the first coordinator server such that a total spacing between the commit timestamps is substantially minimized.

7. The method according to claim 1, further comprising:
   determining, at one or more of the participant servers, that a single-site transaction is to be committed at the participant server;
   computing a single-site commit timestamp having a predetermined pattern for the single-site transaction, the predetermined pattern being one that any multi-site transaction cannot choose as its commit timestamp; and
   committing the single-site transaction at the single-site commit timestamp.

8. The method according to claim 1, further comprising:
   determining, at one or more of the participant servers, that a single-site transaction is to be committed at the participant server; and
   computing a hash value of a transaction ID of the single-site transaction; and restricting the commit timestamp for the single-site transaction by the hash value of the transaction ID of the single-site transaction.

9. The method according to claim 8, further comprising:
wherein restricting the commit timestamp for the single-site transaction comprises setting a predetermined number of lower bits of the commit timestamp of the single-site transaction to be equal to the hash value of the transaction ID of the single-site transaction.

10. The method according to claim 1,
wherein the request to commit a transaction further includes a mutation to update a change log recording the transaction.

11. The method of claim 10,
wherein the commit timestamp is included as a primary key of the change log.

12. The method of claim 10,
wherein at least part of the change log is stored at one of the participant servers.

13. The method of claim 10,
wherein the request to commit a transaction further includes a mutation to update a plurality of change logs recording the transaction.

14. The method of claim 1, wherein the distributed system comprises a relational database and the method further comprises adding at least one column in the relation database to store the commit timestamp as a primary key in the relational database.

15. A computer-implemented method, comprising:
receiving, at a coordinator server and one or more participant servers in a distributed system, a request to commit a transaction;
obtaining, by each of the participant servers, at least one exclusive lock for a time range starting at a locally chosen starting time to a predetermined upper bound;
receiving, at the coordinator server, a notification that each of the participant servers is prepared at a respective prepared timestamp chosen within the respective time range;
computing, at the coordinator server, a commit timestamp for the transaction equal or greater than each of the prepared timestamps;
committing, at the coordinator server and each of the participant servers, the transaction at the commit timestamp; and
releasing, at each of the participant servers, the at least one exclusive lock.

16. The method according to claim 15,
wherein the predetermined upper bound is infinity.

17. The method of claim 15,
wherein the request to commit a transaction further includes a mutation to update a change log recording the transaction.

18. The method of claim 15, wherein the distributed system comprises a relational database and the method further comprises adding at least one column in the relation database to store the commit timestamp as a primary key in the relational database.

19. A system, comprising:
a first coordinator server in a plurality of servers, each of the servers adapted to communicate with each other and clients in a distributed computing environment, the first coordinator server comprising one or more processors configured to:
receive a request to commit a transaction;
receive a notification that any of the other servers functioning as participant servers of the transaction is prepared at a respective prepared timestamp, the respective prepared timestamp being chosen within a time range for which the respective participant server obtained at least one lock;
compute a commit timestamp for the transaction equal or greater than each of the prepared timestamps, such that a second coordinator server sharing at least one of the participant servers for one or more other transactions at a shared shard cannot select the same commit timestamp for any of the other transactions; and
commit the transaction at the commit timestamp.

20. The system according to claim 19, wherein the one or more processors of the first coordinator server is further configured to:
compute a hash value of a transaction ID of the transaction; and
further restricting the commit timestamp for the transaction by the hash value of the transaction ID.

21. The system according to claim 19, wherein the one or more processors of the first coordinator server is further configured to:
determine that one or more requests to commit other transactions is received at the first coordinator server; and
compute a commit timestamp for each of the other transactions received at the first coordinator server such that a total spacing between the commit timestamps is substantially minimized.

22. The system according to claim 19, further comprising:
a participant server, the participant server comprising one or more processors configured to:
determine that a single-site transaction is to be committed at the participant server;
compute a single-site commit timestamp having a predetermined pattern for the single-site transaction, the predetermined pattern being one that any multi-site transaction cannot choose as its commit timestamp; and
commit the single-site transaction at the single-site commit timestamp.

23. The system of claim 19, wherein the distributed computing environment comprises a relational database and the one or more processors are further configured to add at least one column in the relation database to store the commit timestamp as a primary key in the relational database.

* * * * *